(12) United States Patent
Li et al.

(10) Patent No.: US 12,158,277 B2
(45) Date of Patent: Dec. 3, 2024

(54) DEHUMIDIFIER

(71) Applicant: GD MIDEA AIR-CONDITIONING EQUIPMENT CO., LTD., Foshan (CN)

(72) Inventors: Weiming Li, Foshan (CN); Zhigang Xing, Foshan (CN)

(73) Assignee: GD MIDEA AIR-CONDITIONING EQUIPMENT CO., LTD., Foshan (CN)

( * ) Notice: Subject to any disclaimer, the term of this patent is extended or adjusted under 35 U.S.C. 154(b) by 228 days.

(21) Appl. No.: 17/299,144

(22) PCT Filed: Apr. 13, 2020

(86) PCT No.: PCT/CN2020/084368
§ 371 (c)(1),
(2) Date: Jun. 2, 2021

(87) PCT Pub. No.: WO2021/103382
PCT Pub. Date: Jun. 3, 2021

(65) Prior Publication Data
US 2022/0316718 A1    Oct. 6, 2022

(30) Foreign Application Priority Data

Nov. 29, 2019  (CN) .......................... 201911218448.X
Nov. 29, 2019  (CN) .......................... 201922132404.7

(51) Int. Cl.
*F24F 1/0083*    (2019.01)
*B01D 53/26*    (2006.01)
(Continued)

(52) U.S. Cl.
CPC .......... *F24F 1/0083* (2019.02); *B01D 53/265* (2013.01); *F24F 1/00073* (2019.02);
(Continued)

(58) Field of Classification Search
CPC ..... F24F 13/222; F24F 1/00073; F24F 1/0083
See application file for complete search history.

(56) References Cited

U.S. PATENT DOCUMENTS 2,119,127 A * 5/1938 Carrier ................. F24F 1/0083
454/267
4,712,382 A * 12/1987 LeClear ............... F24F 1/0358
220/571
(Continued)

FOREIGN PATENT DOCUMENTS

CN    201811382 U    4/2011
CN    203378869 U    1/2014
(Continued)

OTHER PUBLICATIONS

CN-104633770-A Translation (Year: 2015).*
(Continued)

*Primary Examiner* — Schyler S Sanks
(74) *Attorney, Agent, or Firm* — Anova Law Group, PLLC

(57) ABSTRACT

A dehumidifier includes a machine body including a case. The case includes an air inlet, an air outlet, and an air duct communicating the air inlet and the air outlet. The dehumidifier further includes an axial flow fan arranged in the air duct. An air outlet direction of the axial flow fan is configured to face the air outlet. The dehumidifier also includes a compressor arranged inside the case and side by side with the axial flow fan.

11 Claims, 15 Drawing Sheets

(51) Int. Cl.
*F24F 1/0007* (2019.01)
*F24F 1/0029* (2019.01)
*F24F 1/0067* (2019.01)
*F24F 13/22* (2006.01)

(52) U.S. Cl.
CPC .......... *F24F 1/0029* (2013.01); *F24F 1/0067* (2019.02); *F24F 13/222* (2013.01)

(56) References Cited

U.S. PATENT DOCUMENTS

| | | | | |
|---|---|---|---|---|
| 5,638,695 | A | * | 6/1997 | Kamio .................. F24F 1/0323 62/279 |
| 2014/0150488 | A1 | * | 6/2014 | Black ........................ F24F 3/14 29/890.035 |
| 2019/0137121 | A1 | | 5/2019 | Swanson et al. |

FOREIGN PATENT DOCUMENTS

| | | | |
|---|---|---|---|
| CN | 203533717 U | | 4/2014 |
| CN | 104633770 A | * | 5/2015 |
| CN | 103398425 B | | 3/2016 |
| CN | 107940623 A | | 4/2018 |
| CN | 108613289 A | | 10/2018 |
| CN | 110748988 A | | 2/2020 |
| CN | 110748989 A | | 2/2020 |
| GB | 2259142 A | | 3/1993 |
| IN | 107940624 A | | 4/2018 |
| JP | 1183073 A | | 3/1999 |

OTHER PUBLICATIONS

World Intellectual Property Organization (WIPO) International Search Report and Written Opinion for PCT/CN2020/084368 with translation Jun. 5, 2020 16 Pages.
The European Patent Office (EPO) Extended Search Report for EP Application No. 20888724.0 Oct. 14, 2022 9 Pages.
Canadian Intellectual Property Office the Office Action for CA Application No. 3126309 Oct. 3, 2022 5 Pages.
The Canadian Intellectual Property Office the Office Action for CA Application No. 3126309 Aug. 24, 2023 3 Pages.

* cited by examiner

DEHUMIDIFIER

CROSS-REFERENCE TO RELATED APPLICATIONS

This application is a National Stage Entry under 35 U.S.C. § 371 of International Application No. PCT/CN2020/084368, filed Apr. 13, 2020, which claims priority to Chinese Patent Application No. 201911218448.X, entitled "Dehumidifier," and Chinese Patent Application No. 201922132404.7, entitled "Dehumidifier," both filed on Nov. 29, 2019, the entire contents of which are incorporated herein by reference.

TECHNICAL FIELD

This application relates to the technical field of dehumidifiers, in particular to a dehumidifier.

BACKGROUND

With the improvement of people's living standards, people have higher and higher requirements for indoor living environment. As a device for adjusting air humidity, people's requirements for the dehumidifier also increased. For example, in the conventional dehumidifier, the fan and the compressor are distributed up and down, so that the total height of the machine body is too large, and the internal structure of the machine body is not compact, resulting in low utilization rate of space.

SUMMARY

The main object of the present application is to provide a dehumidifier, which aims to provide a dehumidifier with a reasonable internal structure layout, so as to improve the compactness of the internal structure and improve the utilization rate of space.

In order to achieve the above object, the dehumidifier provided in this application includes:
  a machine body including a case, the case including an air inlet, an air outlet, and an air duct communicating the air inlet and the air outlet;
  an axial flow fan arranged in the air duct, an air outlet direction of the axial flow fan being configured to face the air outlet; and
  a compressor arranged inside the case and side by side with the axial flow fan.

Optionally, the dehumidifier further includes an evaporator and a condenser that are stacked and arranged in the air duct, each having a U shape, and the axial flow fan is located in an area surrounded by the evaporator and the condenser.

Optionally, the air inlet is provided corresponding to a plurality of surfaces of the U-shaped evaporator and condenser.

Optionally, the evaporator is disposed close to an inner side wall of the case, and the condenser is disposed close to the axial flow fan.

Optionally, the air outlet is located at a top of the case.

Optionally, a bottom of the compressor is fixedly connected to a bottom of the case and arranged vertically, the axial flow fan comprises a drive motor and an axial flow impeller, the drive motor is vertically arranged corresponding to the air outlet, and the axial flow impeller is arranged close to the air outlet; and/or,
  a top of the compressor is configured to extend to a middle or an upper part of the drive motor.

Optionally, the dehumidifier further includes a water tank including a receiving cavity, the machine body having a dehumidification function; and
  where the dehumidifier has a working state and an idle state, and the receiving cavity of the water tank is configured to store water formed by dehumidification of the machine body in the working state and receive at least part of the machine body in the idle state.

Optionally, the receiving cavity includes a support boss on an inner side wall, the machine body includes an avoidance slot on an outer side wall corresponding to the support boss, the support boss is received in the avoidance slot in the idle state to at least partially receive the machine body in the receiving cavity; and the avoidance slot is staggered with the support boss in the working state.

Optionally, the support boss is vertically provided along a height direction of the water tank, and the avoidance slot is vertically provided along a height direction of an outer side wall of the machine body.

Optionally, the water tank includes a slot on an outer side wall corresponding to the support boss; and
  a side wall of the water tank is configured to protrude inwards towards inside of the water tank to form the slot outside the water tank and the support boss inside the water tank.

According to the technical solution of this application, by arranging the axial flow fan and the compressor side by side, compared to the conventional arrangement of upper and lower layers, the space occupied by the axial flow fan and the compressor in the height direction is greatly reduced, thereby improving the compactness of the internal components of the dehumidifier, so that the height of the machine body may be greatly reduced, which is conducive to reducing the height and volume of the machine body, thereby facilitating the transportation and storage of the machine body. In addition, since the arrangement of the water tank does not need to be considered for the arrangement of the machine body, the arrangement of the components inside the machine body is more reasonable and compact.

BRIEF DESCRIPTION OF THE DRAWINGS

In order to more clearly explain the embodiments of this application or the technical solutions in the prior art, the drawings used in the description of the embodiments or the prior art will be briefly introduced below. Obviously, the drawings in the following description are merely some embodiments of this application. For those of ordinary skill in the art, other drawings can be obtained based on the structure shown in these drawings without paying creative work.

DESCRIPTION OF REFERENCE NUMERALS

Figure 1:
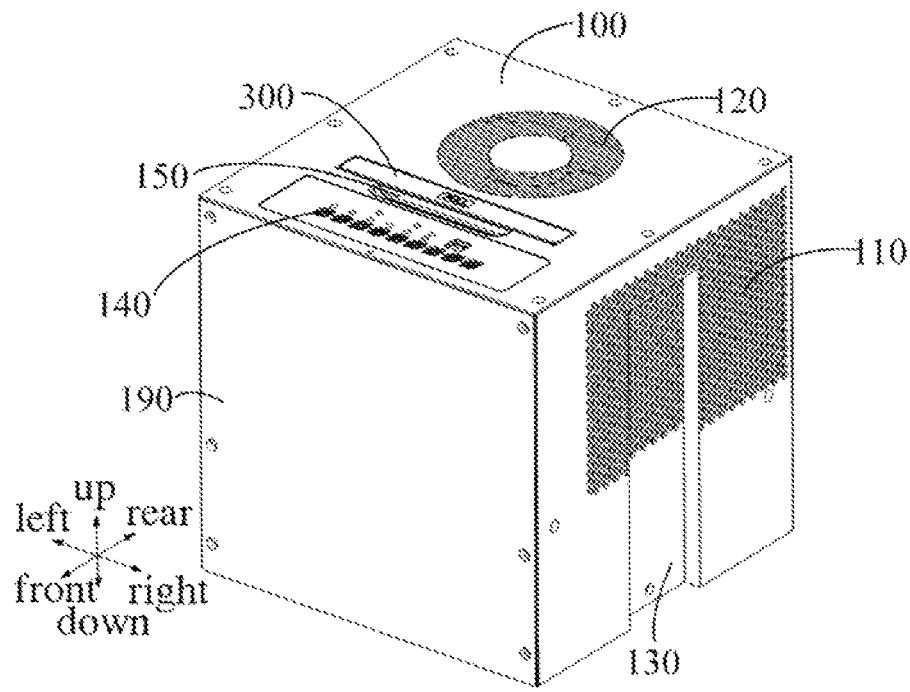
FIG. 1 is a schematic structural diagram of a machine body of a dehumidifier according to an embodiment of this application.
Figure 2:
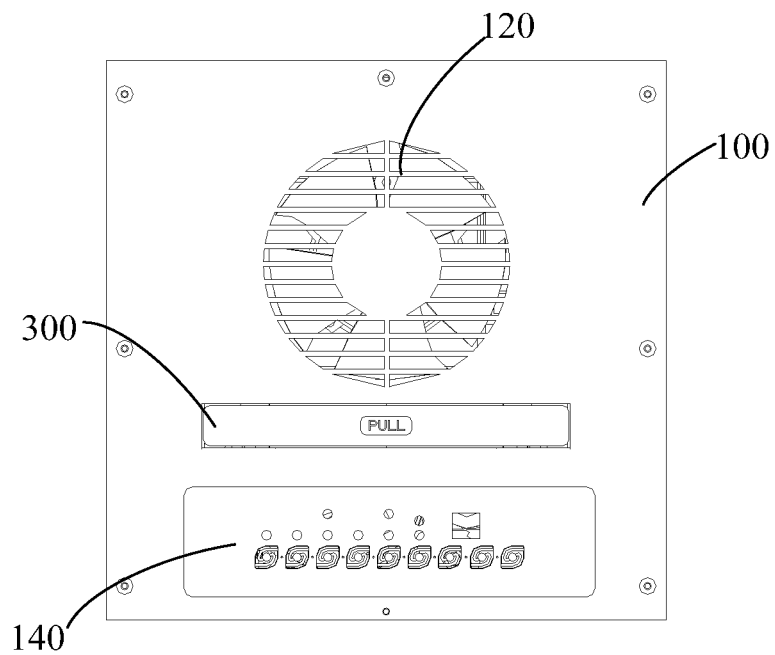
FIG. 2 is a top view of FIG. 1.

| Reference Numeral | Name | Reference Numeral | Name |
|---|---|---|---|
| 100 | Machine body | 110 | Air inlet |
| 120 | Air outlet | 130 | Avoidance slot |
| 140 | Display device | 150 | Hand grip position |
| 168 | Support protrusion | 160 | Storage slot |
| 165 | Drainage hole | 171 | Cord storage column |
| 172 | Limit stopper | 173 | Storage hole |
| 181 | Cable trough | 182 | Retaining rib |
| 190 | Case | 166 | Drainage passage |
| 300' | Lifting handle | 310' | Grip rod |
| 320' | Guide rod | 321' | Guide slot |
| 330' | Fixation column | 300 | Handle |
| 310 | Hand rod | 320 | Connection rod |
| 330 | Recess | 340 | Hand grip notch |
| 510 | Evaporator | 520 | Condenser |
| 530 | Drive motor | 540 | Impeller |
| 550 | Compressor | 560 | Volute |
| 600 | Water level switch | 610 | Float |
| 620 | Guide rod | 630 | Guide hole |
| 640 | Receiving slot | 580 | Enclosure |
| 710 | Electric control box | 720 | Fan capacitor |
| 730 | Support plate (partition plate) | 740 | Compressor capacitor |
| 750 | Water receiving tray | 731 | Mounting gap |
| 200 | Water tank | 210 | Receiving cavity |
| 220 | Support boss | 230 | Hand grip slot |

The realization of the purpose of this application, functional characteristics, and advantages will be further described in connection with the embodiments and with reference to the accompanying drawings.

DETAILED DESCRIPTION OF THE EMBODIMENTS

In the following, the technical solutions in the embodiments of this application will be clearly and completely described in connection with the drawings in the embodiments of this application. Obviously, the described embodiments are only a part of the embodiments of this application, but not all of the embodiments. Based on the embodiments of this application, all other embodiments obtained by those of ordinary skill in the art without creative efforts shall fall within the claimed scope of this application.

It should be noted that all directional indicators (such as up, down, left, right, front, back . . . ) in the embodiments of this application are only used to explain the relative positional relationship, movement conditions, etc. among the components in a specific attitude (as shown in the drawings), if the specific attitude changes, the directional indicator also changes accordingly.

In addition, the description related to "first," "second," etc. in this application is only used for description purposes, it cannot be understood as indicating or implying its relative importance or implicitly indicating the number of technical features indicated. Therefore, a feature associated with "first" and "second" may explicitly or implicitly include at least one of such feature. In addition, "and/or" in the full text includes three scenarios. Take A and/or B as an example, it includes A technical solution, B technical solution, and technical solutions that A and B are both met. In addition, the technical solutions of the various embodiments can be combined with each other, but they must be based on the ability of those skilled in the art to realize. When the combination of technical solutions conflicts with each other or cannot be realized, it should be considered that the combination of such technical solutions does not exist, or is not within the scope of protection defined by the claims of this application.

This application mainly provides a dehumidifier, which mainly provides an arrangement relationship between a machine body 100 and a water tank 200. The machine body 100 has a dehumidification function. When the dehumidifier is in a working state, the water tank 200 is configured to store water formed by the machine body 100. When the dehumidifier is in an idle state, the water tank 200 is configured to receive the machine body 100. In this way, a volume of the water tank 200 is greatly increased, so that the water tank 200 may store more water, so that a continuous working time of the dehumidifier is greatly extended, a number of times the user pours water is reduced, which is beneficial to improving the use experience of the user. Further, in the idle state, a volume of the dehumidifier may be greatly reduced, and a loading quantity during transportation may be increased, which is beneficial to greatly reducing transportation and storage costs. Based on this, corresponding improvements have been made to an air duct structure, a support method, a form of the water tank 200, a water level switch 600, a form of a lifting handle 300', a cord coiling structure, etc. of the machine body 100.

The following will mainly use embodiments to describe the specific structure of the dehumidifier. Specifically, first an overall and support relationship of the machine body 100 and the water tank 200 are introduced, then the form of the water tank 200, the cord coiling structure and the water level switch 600 are introduced, and then the air duct system and the form of the lifting handle 300' are introduced.

Referring to FIGS. 1 to 5, in some embodiments of this application, the dehumidifier includes:

a machine body 100, having a dehumidification function; and a water tank 200, including a receiving cavity 210.

The dehumidifier has a working state and an idle state. In the working state, the receiving cavity 210 of the water tank 200 is configured to store water formed by dehumidification of the machine body 100. In the idle state, at least part of the machine body 100 is received in the receiving cavity 210.

Specifically, in this embodiment, the machine body 100 has a dehumidification function, that is, the machine body 100 may remove moisture in the air. There are many ways of dehumidification, such as condensation dehumidification, that is, air is cooled under normal pressure below the dew point temperature to condense water vapor into condensed water; compressed dehumidification, for example, air is compressed and then cooled to condense water vapor in the air into water; adsorption dehumidification, which may be achieved by solid adsorption dehumidification or liquid adsorption dehumidification. In the following embodiments of this application, a refrigerant circulation system formed by a combination of a compressor 550, an evaporator 510, a condenser 520, a throttling device, etc. is used as an example to cool and dehumidify air. An overall shape of the machine body 100 may be one of many, such as a cuboid, a cube, a cylinder, etc. Take a square-like or round-like cross section as an example. An overall shape of the receiving cavity 210 of the water tank 200 is similar to the overall shape of the machine body 100, so that the machine body 100 may be received while saving space.

When the dehumidifier is working, the machine body 100 may be arranged directly above the water tank 200, so that the generated condensate water may flow into the water tank 200 under the action of gravity. In addition, as the water in the water tank 200 increases, the stability of the dehumidifier in the working state gradually increases. Certainly, in some embodiments, in the working state, the water tank 200 may also be arranged directly above the machine body 100, or the water tank 200 and the machine body 100 may be arranged side by side. In this case, a water pump needs to be mounted to pump the water in the machine body 100 into the water tank 200 thereabove. In the working state, the entire water tank 200 may be configured to store water, so that the volume of the water tank 200 may be greatly increased, which is beneficial to reducing the number of times the user pours water. It is worth noting that parallel refers to roughly parallel, allowing small deviations.

When the dehumidifier is in the idle state, part or all of the machine body 100 is received in the receiving cavity 210 of the water tank 200. There are many ways to receive the machine body 100, such as placing the water tank 200 with an opening facing upward, and the machine body 100 enters into and taken out from the receiving cavity 210 through the opening in up and down directions. Specifically, the opening of the water tank 200 is upward, and the machine body 100 enters into and exits from the water tank 200 through the opening. In some embodiments, the machine body 100 may also be placed on the ground, and the water tank 200 may be turned upside down, and then cover an outside of the machine body 100. Either way, the volume of the dehumidifier in the idle state is greatly reduced, so that the loading quantity may be increased during storage and transportation, which is beneficial to greatly saving transportation and storage costs.

In order to further better load the machine body 100 into the water tank 200, the overall shape and size of the machine body 100 are equivalent to the shape and size of the receiving cavity 210. A height of the machine body 100 is equivalent to a height of the receiving cavity 210. For example, the overall shape of the machine body 100 is cylindrical, and the overall shape of the receiving cavity 210 is also a cylindrical space.

Regarding the specific structure of the machine body 100, the machine body 100 includes a case 190, and the case 190 includes an air inlet 110, an air outlet 120, and an air duct communicating the air inlet 110 and the air outlet 120. An air duct assembly and a heat exchanger assembly are provided inside the air duct. There are many positions where the air inlet 110 and the air outlet 120 may be formed. For example, the air inlet 110 may be formed on a peripheral side (front, rear, left, right) or a top of the case 190, and the air outlet 120 may be formed on the peripheral side (front, rear, left, right) or the top of the case 190. Take the air inlet 110 being formed on the peripheral side of the case 190, and the air outlet 120 being formed on the top of the case 190 as an example. Certainly, in some embodiments, in order to prevent external dust, insects, mice, etc., from affecting the operation of the dehumidifier, a filter screen may be provided at the positions of the air inlet 110 and the air outlet 120. Certainly, in some embodiments, several meshes may be directly formed on the case 190 instead of the filter screen.

In this embodiment, the dehumidifier is divided into two parts: the machine body 100 and the water tank 200, and the machine body 100 has an independent dehumidification function, which may collect water vapor in the air. In the working state, the machine body 100 is arranged above the entire water tank 200, so that the entire water tank 200 may be configured for storing water. In this way, the volume and utilization of the water tank 200 may be greatly increased, so that the continuous working time of the dehumidifier may be greatly extended, and the number of times the user pours water is reduced, which is beneficial to improving the use experience of the user. Further, in the idle state, the machine body 100 may be at least partially received in the receiving cavity 210, the volume of the dehumidifier in the idle state is greatly reduced, so that the loading quantity may be increased during storage and transportation, which is beneficial to greatly saving transportation and storage costs.

In some embodiments, in order to ensure that the machine body 100 may be stably arranged on a top of the water tank 200 in the working state, the top of the water tank 200 is provided with a support structure. In the working state, the machine body 100 is arranged on the support structure. The support structure may be a structure that is fixedly connected to the water tank 200, or may be a structure that is movably connected to the water tank 200. If the support structure is a structure that is fixedly connected to the water tank 200, in order to maximize the utilization of the space, it is necessary to provide an avoidance position corresponding to the support structure on an outer side wall of the machine body 100, so that the machine body 100 may be smoothly placed in the water tank 200 after adjusting a certain angle. If the support structure is a structure that is movably connected to the water tank 200, it may be realized that in the working state, the support structure may extend into the receiving cavity 210 to support the machine body 100, and in the idle state, the support structure may exit the receiving cavity 210, so that the machine body 100 may be unobstructedly received in the water tank 200. Specifically, the support structure may be movably provided on the water tank 200, so that the support structure may extend into the receiving cavity 210 in the working state, and be drawn out from the receiving cavity 210 in the idle state.

In some embodiments, in order to further improve the installation stability of the machine body 100 in the working state, the support structure is provided on an inner side wall of the receiving cavity 210, and a top of the support structure is lower than an edge of the opening of the water tank 200. In this way, when the machine body 100 is supported by the support structure, a part of the machine body 100 is located in the water tank 200, so that while the center of gravity moves down, the machine body 100 may be more limited by the inner side wall of the water tank 200, which may further improve the stability of the dehumidifier.

Figure 3:
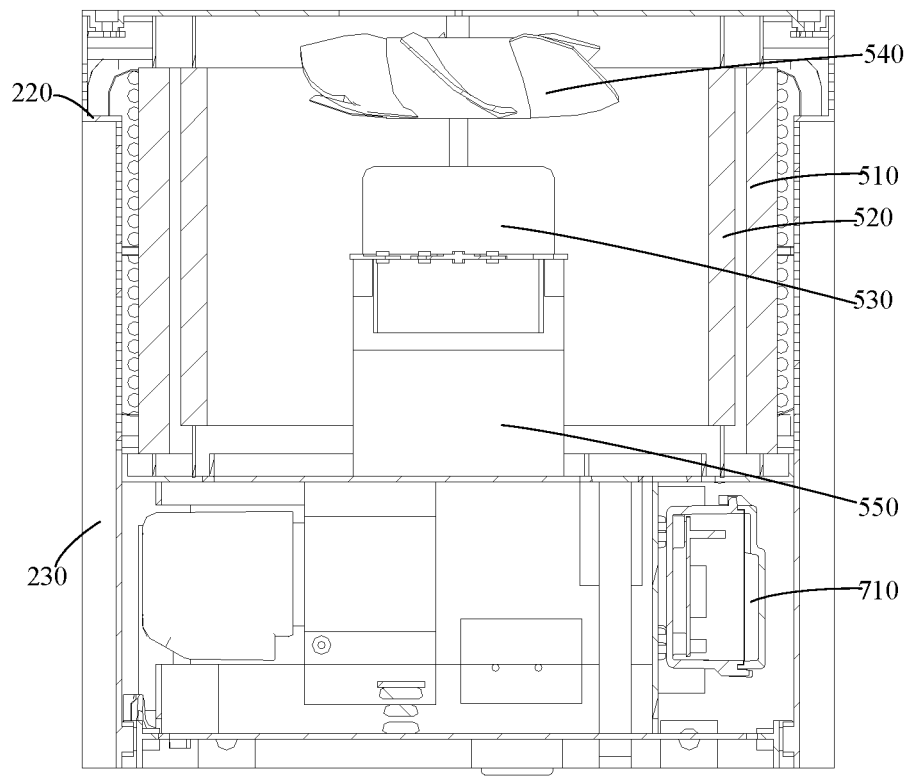
FIG. 3 is a schematic diagram showing an internal structure of the dehumidifier in an idle state according to an embodiment of this application.
Figure 4:
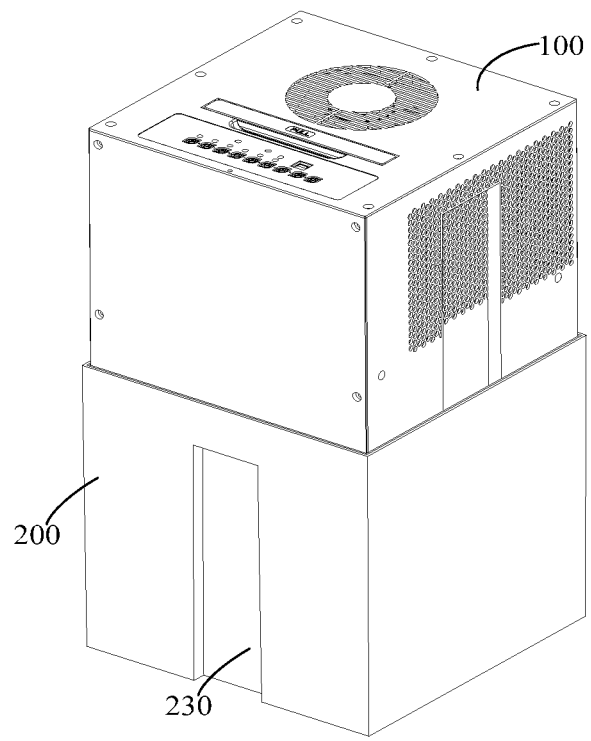
FIG. 4 is a schematic structural diagram of the dehumidifier in a working state according to an embodiment of this application.
Figure 5:
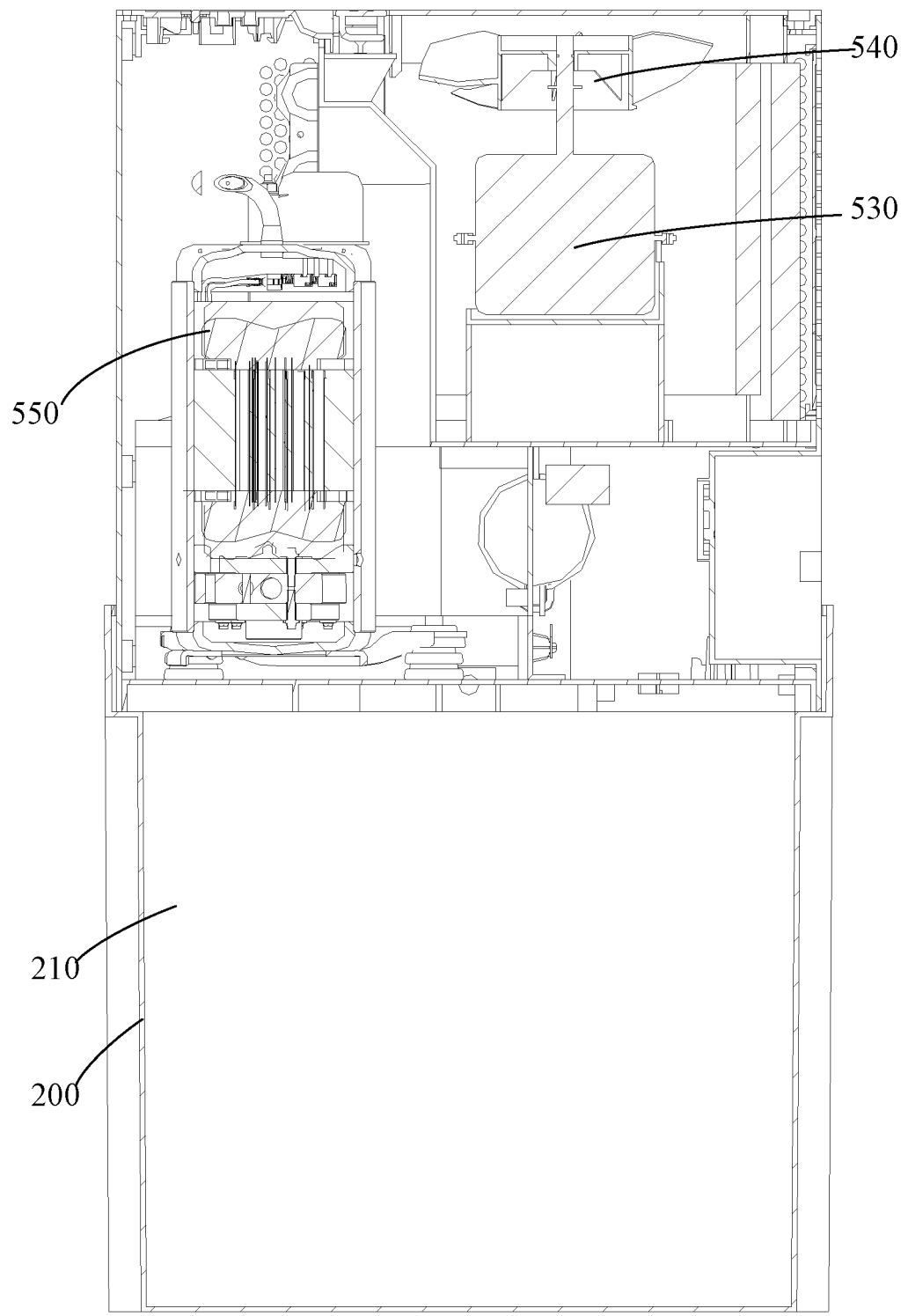
FIG. 5 is a schematic diagram showing an internal structure of the dehumidifier in a working state according to an embodiment of this application.
Figure 6:
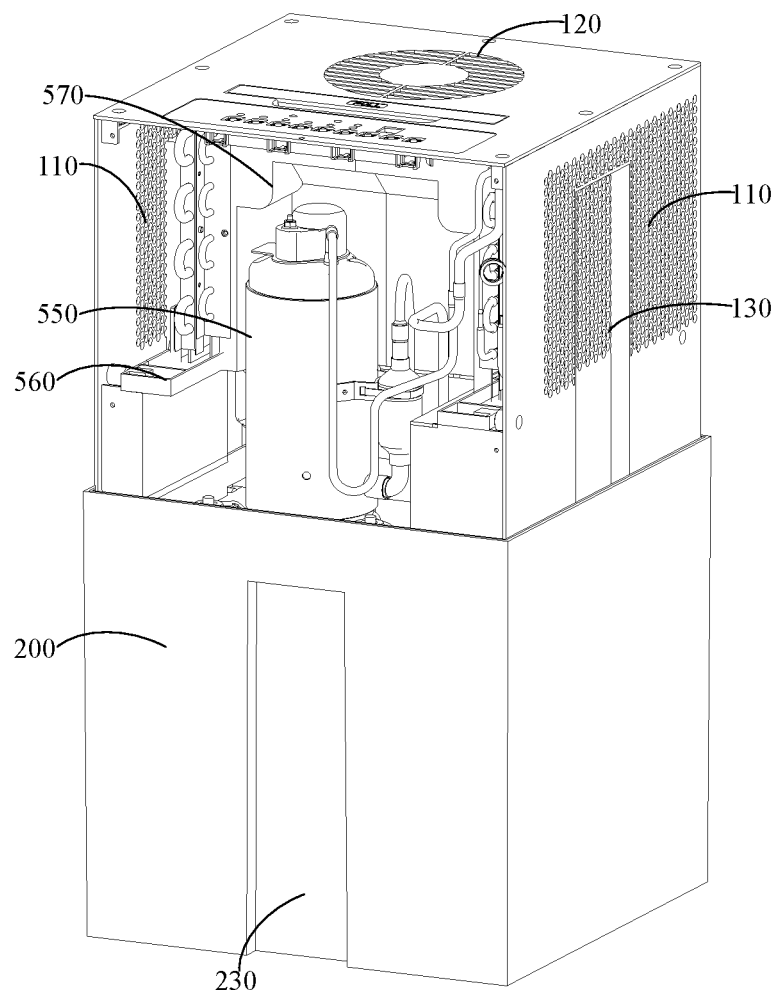
FIG. 6 is a schematic diagram showing the internal structure of the dehumidifier in the working state according to another embodiment of this application.
Figure 7:
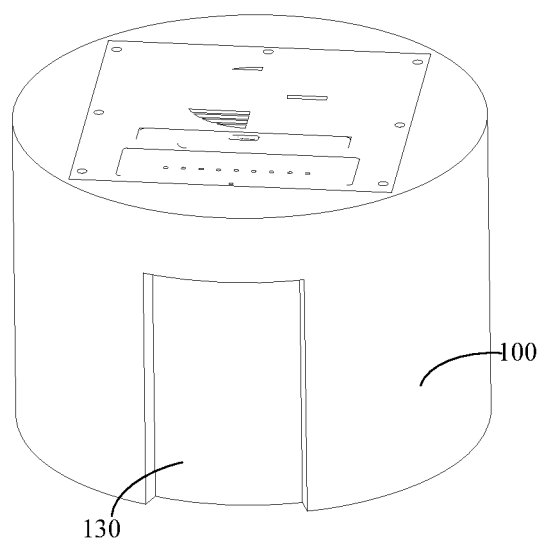
FIG. 7 is a schematic structural diagram of a machine body of a dehumidifier according to an embodiment of this application.
Figure 8:
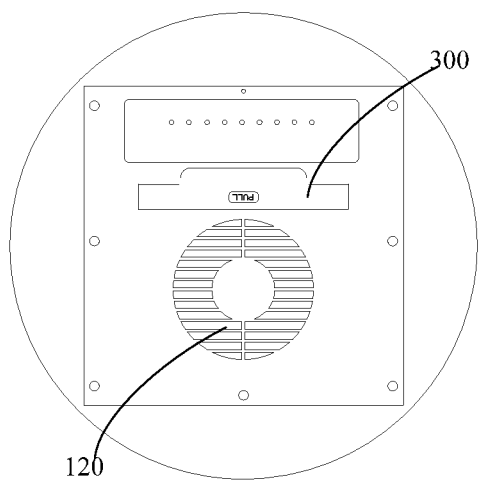
FIG. 8 is a top view of FIG. 7.
Figure 9:
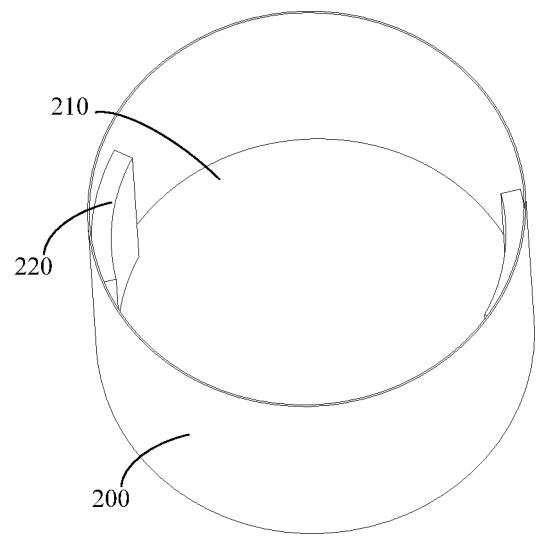
FIG. 9 is a schematic structural diagram of a water tank of the dehumidifier according to an embodiment of this application.
Figure 10:
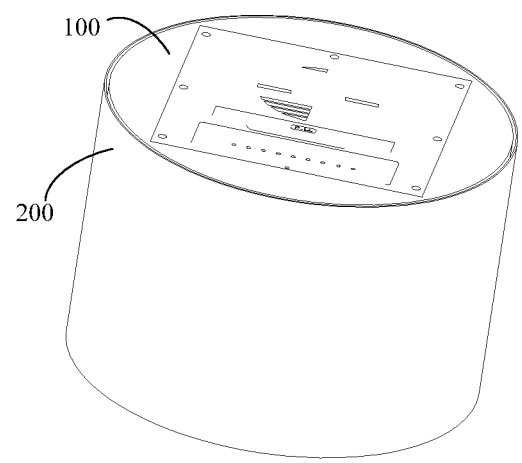
FIG. 10 is a schematic structural diagram of the dehumidifier in the idle state according to another embodiment of this application.
Figure 11:
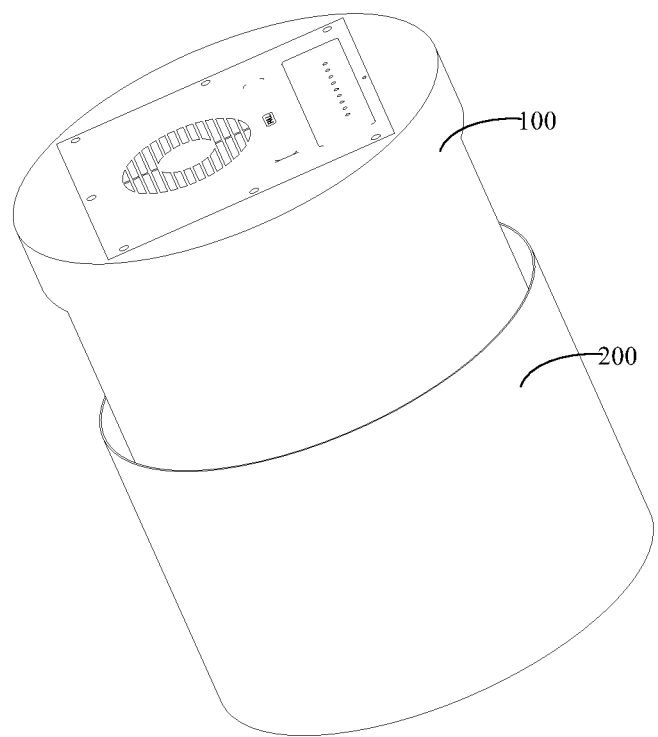
FIG. 11 is a schematic structural diagram of the dehumidifier in the working state according to another embodiment of this application.
Figure 12:
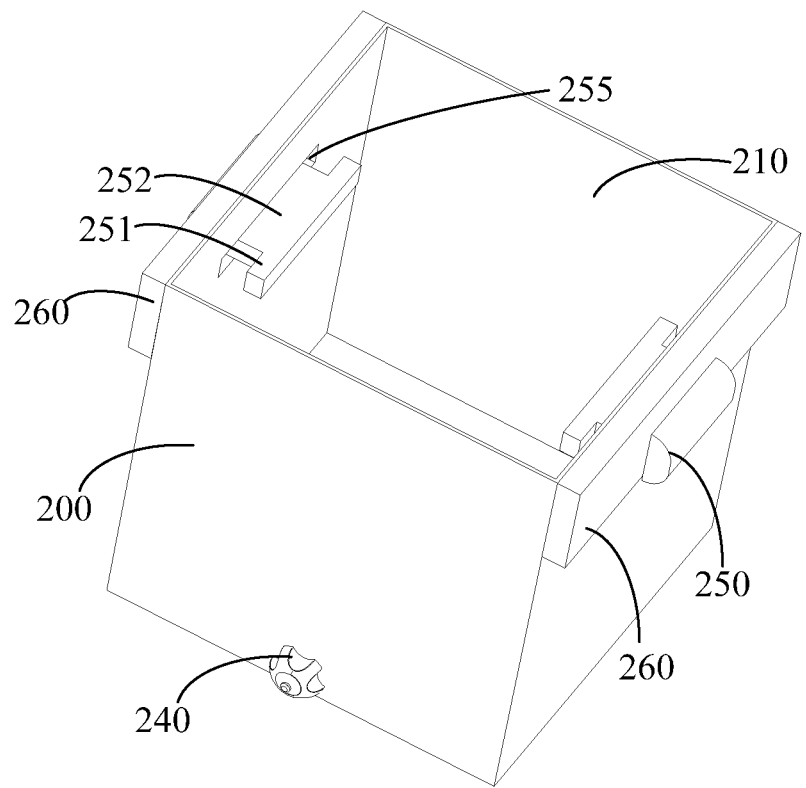
FIG. 12 is a schematic structural diagram of the water tank of the dehumidifier according to another embodiment of this application.
Figure 13:
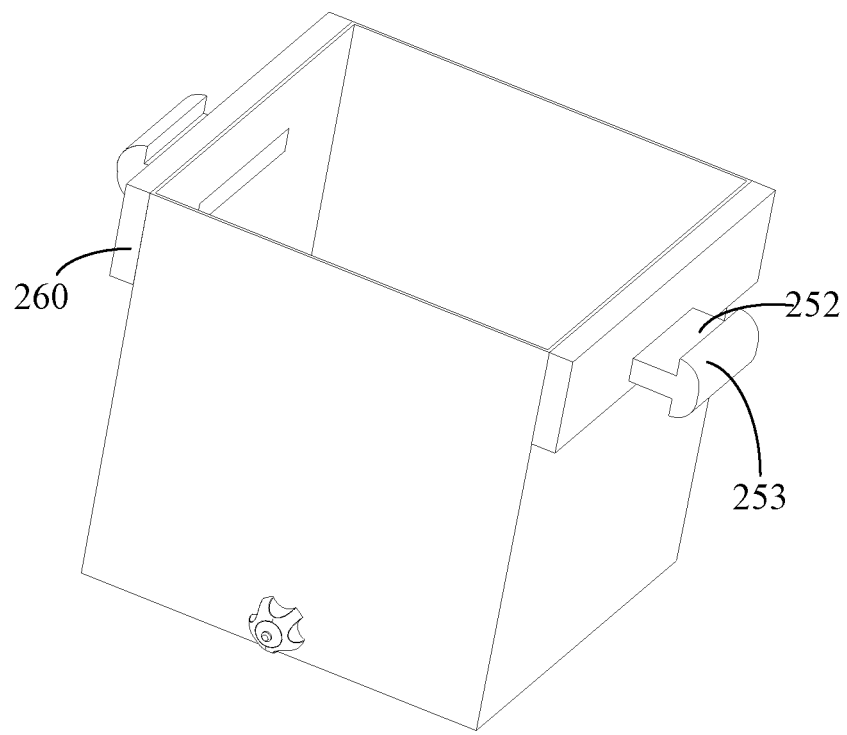
FIG. 13 is another schematic structural diagram of FIG. 12 in the working state.
Figure 14:
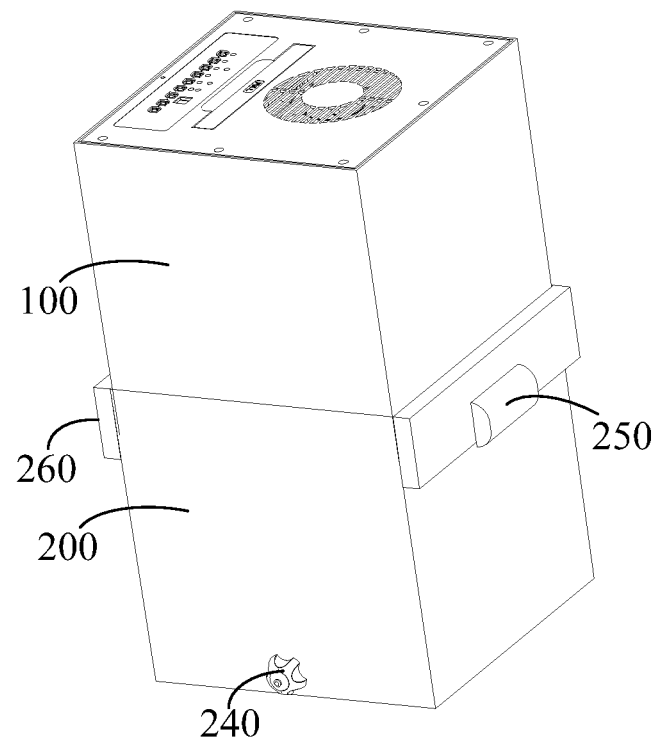
FIG. 14 is a schematic structural diagram of the dehumidifier in the working state according to still another embodiment of this application.
Figure 15:
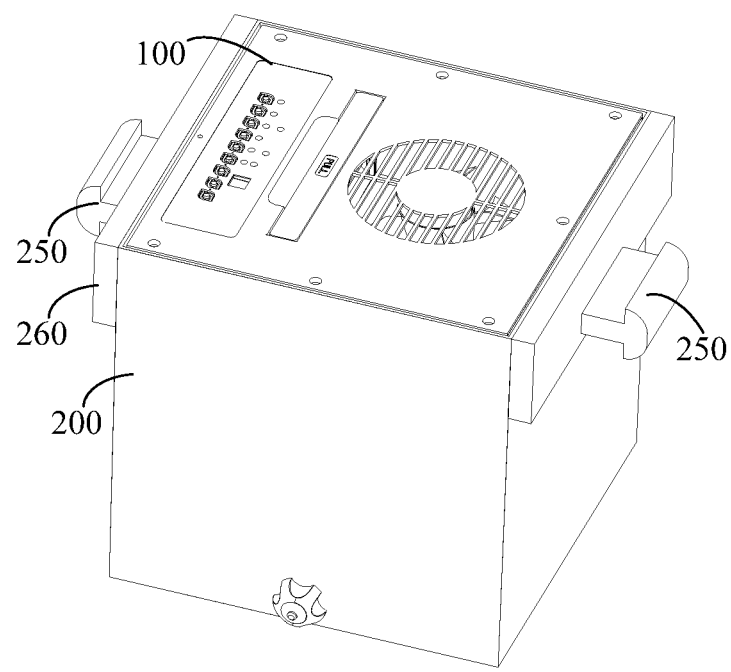
FIG. 15 is a schematic structural diagram of the dehumidifier in the idle state according to still another embodiment of this application.

Some specific support methods are described as follows.
The support structure is provided on the water tank 200.
Referring to FIGS. 3 to 5, the support structure is fixedly provided on the water tank 200.

The water tank 200 includes a receiving cavity 210, and an inner side wall of the receiving cavity 210 is provided with a support boss 220. The dehumidifier has a working state, and a bottom of the machine body 100 abuts against the support boss 220 in the working state. The support boss 220 may have one of many shapes, such as square, arc, round, etc. Take the shape similar to the inner side wall of the receiving cavity 210 as an example. For example, when the inner side wall is flat, a cross section of the support boss 220 may be rectangular, and when the inner side wall is curved, the cross section of the support boss 220 may be curved. In this way, the utilization rate of the support boss 220 may be improved as much as possible, and a contact area between the bottom of the machine body 100 and the support boss 220 may be increased. Take a support surface of the support boss 220 being a flat surface as an example.

In this embodiment, a dehumidifier is divided into two parts: a machine body 100 and a water tank 200, and the machine body 100 has an independent dehumidification function, which may collect water vapor in the air. And, a support boss 220 is provided on an inner side wall of the water tank 200, so that a bottom of the machine body 100 may abut against the support boss 220 in the working state, so as to achieve cooperation of the machine body 100 and the water tank 200. Further, the machine body 100 is arranged above the entire water tank 200, so that the entire water tank 200 may be configured for storing water. In this way, the volume and utilization of the water tank 200 may be greatly increased, so that the continuous working time of the dehumidifier may be greatly extended, and the number of times the user pours water is reduced, which is beneficial to improving the user experience.

In some embodiments, in order to realize that the machine body 100 is received in the water tank 200, the machine body 100 includes an avoidance slot 130 on an outer side wall corresponding to the support boss 220. The dehumidifier has an idle state, and the support boss 220 is received in the avoidance slot 130 in the idle state to receive at least part of the machine body 100 in the receiving cavity 210. The avoidance slot 130 is staggered with the support boss 220 in the working state. By including the avoidance slot 130 on the outer side wall of the machine body 100, when the avoidance slot 130 and the support boss 220 are provided correspondingly, the machine body 100 may be received in the receiving cavity 210. When the avoidance slot 130 is staggered with the support boss 220, the bottom of the machine body 100 may be supported by the support boss 220. There are many staggering configurations, which are related to the specific shapes of the machine body 100 and the water tank 200. When the water tank 200 and the machine body 100 are both arranged in a rectangular shape, the two support bosses 220 can be arranged in a non-symmetrical structure (the two support bosses 220 are provided on two opposite or adjacent side walls), and staggering of the avoidance slot 130 and the support boss 220 may be realized by adjusting the machine body 100 by 180°. When the water tank 200 and the machine body 100 are square, the staggering of the avoidance slot 130 and the support boss 220 may be realized by adjusting the machine body 100 by 90°. When the cross-sections of the water tank 200 and the machine body 100 are both similar to circular, there are many rotation angles to achieve staggering, as long as the avoidance slot 130 does not correspond to the support boss 220.

In some embodiments, in order to improve the smoothness and reliability of the machine body 100 entering the water tank 200, the support boss 220 is vertically provided along a height direction of the water tank 200, and the avoidance slot 130 is vertically provided along a height direction of an outer side wall of the machine body 100. By providing the support boss 220 and the avoidance slot 130 vertically, the machine body 100 may move straightly up and down when entering the water tank 200, which is beneficial to the convenient movement of the machine body 100. Further, the avoidance slot 130 also plays a guiding role during a moving process of the machine body 100, and the support boss 220 plays a role as a guide post, so that the machine body 100 may accurately fall into a preset position in the water tank 200 along the support boss 220.

In some embodiments, in order to facilitate the transportation of the water tank 200 and save material, the outer side wall of the water tank 200 includes a slot corresponding to the support boss 220. The slot may be configured as a hand grip slot 230 of the water tank 200 to facilitate the transportation of the water tank 200. Further, the arrangement of the slot reduces the amount of materials used to manufacture the water tank 200, thereby reducing the manufacturing cost of the water tank 200. The hand grip slot 230 may have one of many forms, such as being formed through a later-described process, or directly integral injection molding. Certainly, in some embodiments, the slot is formed by a side wall of the water tank 200 protruding inwards towards inside of the water tank 200, and a protruding part forms the support boss 220. In this way, while simplifying the process, the materials used are reduced, and material costs and process costs are saved.

In some embodiments, in order to improve the stability of the support of the machine body 100, a number of the support bosses 220 is two, and the two support bosses 220 are provided on two opposite side walls of the water tank 200. A number of the avoidance slots 130 is two, and the two avoidance slots 130 are formed on two opposite side walls of the machine body 100. By providing the support bosses 220 on the two opposite side walls of the water tank 200, opposite sides of the machine body 100 are supported, which is beneficial to improving the stability of the machine body 100.

In some embodiments, in order to further improve the installation stability of the machine body 100, a top of the support boss 220 is lower than an edge of the opening of the water tank 200. In this way, a part of the bottom of the machine body 100 is located in the receiving cavity 210, so that the machine body 100 is more restricted by the side wall of the receiving cavity 210. In addition, it is also beneficial to lowering the overall center of gravity of the dehumidifier, thereby improving the overall stability of the dehumidifier.

The support structure is provided on the water tank 200.

Referring to FIGS. 12 to 15, the support structure is movably connected to the water tank 200.

The dehumidifier includes a support 250 that is movably connected to the water tank 200. The dehumidifier has a working state and an idle state. In the working state, the support 250 extends into the receiving cavity 210 to support the machine body 100. In the idle state, the support 250 is drawn out from the receiving cavity 210 so that the machine body 100 may be at least partially received in the receiving cavity 210.

Specifically, in this embodiment, the support 250 may have one of many forms, such as a rod shape, a block shape, and so on. There are many ways for the support 250 to be movably connected to the water tank 200, such as moving relative to the water tank 200, rotating relative to the water tank 200, and so on. That is to say, the support 250 realizes the two actions of extending into the receiving cavity 210 and exiting the receiving cavity 210 by rotating or moving. When the support 250 is rotated relative to the water tank 200, a position of a rotational connection may be on the side wall of the water tank 200.

In this embodiment, a dehumidifier is divided into two parts: a machine body 100 and a water tank 200, and the machine body 100 has an independent dehumidification function, which may collect water vapor in the air. And, a support 250 is provided on a side wall of the water tank 200, so that the support 250 may extend into the receiving cavity 210 and a bottom of the machine body 100 may abut against the support boss 250 in the working state, so as to achieve cooperation of the machine body 100 and the water tank 200. Further, the machine body 100 is arranged above the entire water tank 200, so that the entire water tank 200 may be configured for storing water. In this way, the volume and utilization of the water tank 200 may be greatly increased, so that the continuous working time of the dehumidifier may be greatly extended, and the number of times the user pours water is reduced, which is beneficial to improving the use experience of the user. In the idle state, the support 250 may be drawn out from the receiving cavity 210, and the machine body 100 may be at least partially received in the water tank 200. The volume of the dehumidifier after assembly is greatly reduced, so that the loading quantity may be increased during storage and transportation, which is beneficial to greatly saving transportation and storage costs.

The following takes the support 250 moving relative to the water tank 200 as an example for description. In some embodiments, the inner side wall of the receiving cavity 210 includes a drawing opening, and the support 250 is mounted in the drawing opening in a push and pull manner. With the drawing opening, the support 250 may enter and exit the receiving cavity 210 through the drawing opening. When the machine body 100 needs to be supported, the support 250 may be pushed into the receiving cavity 210. When the machine body 100 needs to be received in the water tank 200, the support 250 may be drawn out from the receiving cavity 210, which is easy to operate.

Specifically, the support 250 includes a support member 251, a handle member 253, and a connection arm 252 connecting the support member 251 and the handle member 253. The handle member 253 is located outside the water tank 200. The support member 251 is located in the receiving cavity 210 in the working state, and exits the receiving cavity 210 in the idle state. The support member 251 is configured to support the machine body 100. The handle member 253 is configured for the operator to hold. The support member 251 is connected to the handle member 253 through the connection arm 252, and the handle member 253 may control a position of the support member 251 through the connection arm 252. When the support 250 is drawn out, the operator may use the support 250 as a handle [300] to carry the water tank 200 or the dehumidifier in the idle state. In this way, the utilization rate of the support 250 is improved.

In order to make the movement of the machine body 100 in the water tank 200 completely unaffected by the support 250, a length of the support member 251 is greater than a width of the connection arm 252. The drawing opening is a stepped opening, and one end of the drawing opening with a larger size is close to the receiving cavity 210 and may receive the support member 251. That is, a length of the end of the drawing opening with a larger size is greater than or equal to the length of the support member 251. When the support member 251 exits the receiving cavity 210, it is received in the drawing opening, so that the support member 251 does not protrude from the inner side wall of the receiving cavity 210. In this way, the support member 251 does not interfere with the movement of the machine body 100 in the water tank 200 at all.

In order to prevent the support 250 from being separated from the water tank 200, the length of the support member 251 is greater than a length of an end of the drawing opening with a smaller size. In this way, the support member 251 cannot be separated from the water tank 200 through the drawing opening, that is, the support 250 is always connected with the water tank 200 no matter in the working state or in the idle state. In this way, the support 250 is prevented from being lost.

In order to prevent the support 250 from falling into the receiving cavity 210, a width of the handle member 253 is larger than a width of the end of the drawing opening with a smaller size, and/or, a length of the handle member 253 is larger than a length of the end of the drawing opening with a smaller size. In this way, through the limitation of the sizes, the handle member 253 cannot enter the drawing opening, so that the operator may easily grasp the handle member 253 at any time, which is convenient for the operator to operate.

In some embodiments, in order to improve the operating comfort of the operator, a side of the handle member 253 facing away from the outer side wall of the water tank 200 includes a handle arc surface. The operator will not be scratched by edges and corners when grasping the handle member 253 through the handle arc surface, and further, a contact area between the handle member 253 and the hand is increased, which is beneficial for the operator to hold the handle member 253 more stably and reliably.

When the water tank 200 filled with water or the dehumidifier loaded with the machine body 100 is transported through the handle member 253, the load borne by the handle member 253 is relatively large, and the relatively large load is finally transferred to the water tank 200. In order to improve the load-bearing strength of the water tank 200, the dehumidifier further includes a reinforcement plate 260. The reinforcement plate 260 is provided at a position corresponding to the drawing opening, and the drawing opening is penetrated through the reinforcement plate 260 and the side wall of the water tank 200. By providing the reinforcement plate 260, the carrying capacity around the drawing opening is increased, thereby increasing the carrying capacity of the water tank 200, which is beneficial to improving the reliability of the dehumidifier.

In order to ensure the water holding space of the water tank 200 as much as possible, the support 250 is provided on an upper part of the water tank 200. In this way, both a middle and a lower part of the water tank 200 may be configured to hold water, which is beneficial to ensuring an effective water holding space of the water tank 200. In order to improve reliability, a number of the support 250 is two, which are provided on two opposite side walls of the water tank 200.

Referring to FIGS. 7 to 11, regarding the form of the water tank 200.

The machine body 100 has a dehumidification function, and the overall shape of the machine body 100 is cylindrical-like. The water tank 200 includes a receiving cavity 210, and the water tank 200 is cylindrical-like. The dehumidifier has an idle state, and in the idle state, the machine body 100 is at least partially received in the water tank 200.

Specifically, in this embodiment, the overall shape of the machine body 100 is cylindrical-like, which means that the overall shape is similar to a cylinder, and according to the requirements of process and installation, protrusions or depressions are formed on an outer surface of the cylinder. In the same way, the water tank 200 is cylindrical-like, which means that the overall shape of the water tank 200 is similar to a cylinder, and according to the requirements of the process and installation cooperation, protrusions or recesses are formed on a surface or an inner side wall.

In this embodiment, by providing the overall shape of the machine body 100 to be cylindrical-like, and the overall shape of the water tank 200 to be cylindrical-like, when the machine body 100 is received in the water tank 200, compared to the shape with sharp corners, there is no strict directionality, which facilitates the placement of the machine body 100 in the water tank 200, which is beneficial to improving the efficiency of the cooperation between the machine body 100 and the water tank 200.

In order to reliably support the machine body 100, the inner side wall of the receiving cavity 210 has a support boss 220. The dehumidifier has a working state, and a bottom of the machine body 100 abuts against the support boss 220 in the working state. The machine body 100 includes an avoidance slot 130 on an outer side wall corresponding to the support boss 220. The dehumidifier has an idle state, and the support boss 220 is received in the avoidance slot 130 in the idle state to at least partially receive the machine body 100 in the receiving cavity 210. The avoidance slot 130 is staggered with the support boss 220 in the working state.

In some embodiments, in order to improve the utilization of the support boss 220, the support boss 220 is provided in an arc shape along the inner side wall of the receiving cavity 210 in its width direction. In this way, the bottom of the machine body 100 may abut against as many support bosses 220 as possible.

In some embodiments, in order to further improve the support stability of the machine body 100, a number of the support bosses 220 is at least two, and the at least two support bosses are provided circumferentially along the inner side wall of the receiving cavity 210 at intervals. A number of the avoidance slots 130 is at least two, the at least two avoidance slots 130 are arranged corresponding to the support bosses 220 on the outer side wall of the machine body 100 at intervals.

It is worth noting that as the volume of the water tank 200 increases, when there is more water stored in the water tank 200, the water tank 200 is too heavy to carry for pouring water. At this time, in order to facilitate the user to pour water, a drainage hole 240 is formed at a lower part or a bottom of the water tank 200. By providing the drainage hole 240, water in the water tank 200 may be drained through the drainage hole 240, without requiring the user to lift the water tank 200 to pour water, which is beneficial to the use of the user.

Figure 16:
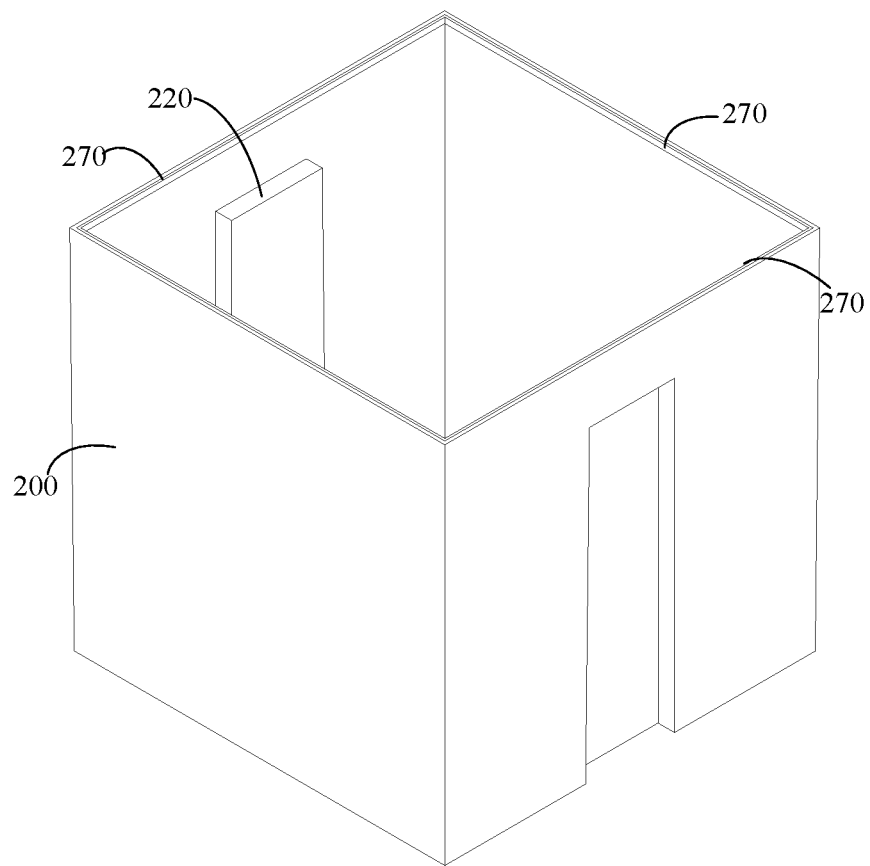
FIG. 16 is a schematic structural diagram of the water tank of the dehumidifier according to still another embodiment of this application.

Refer to FIG. 16, regarding anti-scratch.

The dehumidifier includes a protective element which is provided on an upper part of the inner side wall of the water tank 200, and/or, a lower part of an outer side wall of the machine body 100. The dehumidifier has an idle state, and in the idle state, the machine body 100 may be at least partially received in the water tank 200 through an opening.

Specifically, in this embodiment, a shape of the protective element may be one of many, such as a sheet shape, a strip shape, or a block shape. The protective element may also be made of one of many materials, such as elastic materials, such as rubber, elastic plastic, etc., or flexible materials, such as cotton wool fabrics. The protective element is mainly configured to isolate the outer side wall of the machine body 100 and the inner side wall of the water tank 200 to prevent the outer side wall of the machine body 100 from being scratched. Therefore, the protective element may be provided on the outer side wall of the machine body 100, or on the inner side wall of the receiving cavity 210.

In this embodiment, by providing the protective element, when the machine body 100 is loaded in the water tank 200, the protective element is isolated between the outer side wall of the machine body 100 and the inner side wall of the water tank 200, thereby avoiding direct contact and friction between the outer side wall of the machine body 100 and the inner side wall of the water tank 200, thereby protecting the outer side wall of the machine body 100 and avoiding the outer side wall of the machine body 100 from being scratched.

In some embodiments, in order to further improve the utilization of the protective element, a top of the protective element is flush with a top of the opening side of the water tank 200; or, a bottom of the protective element is flush with the bottom of the machine body 100.

In this embodiment, by providing the protective element at the opening of the water tank 200 or at the bottom of the machine body 100, the protective element may always act as an isolation beginning from the machine body 100 and the water tank 200 first come into contact until the machine body 100 completely enters into the water tank 200. In this way, the utilization rate of the protective element is improved.

There are many ways to connect the protective element to the inner side wall of the water tank 200 or the outer side wall of the machine body 100, and the protective element may be bonded to the inner side wall of the water tank 200 or the outer side wall of the machine body 100. In some embodiments, the inner side wall of the water tank 200 or the outer side wall of the machine body 100 includes a snapped slot, and the protection member is snapped in the snapped slot. An outer side of the protective element protrudes from the outer side wall of the machine body 100 or the inner side wall of the water tank 200.

Take the protective element including a protective strip as an example. The protective strip extends along a circumference of the water tank 200 or extends along a circumference of the machine body 100. That is, the protective element is provided around the inner side wall of the water tank 200 or provided around the outer side wall of the machine body 100. The protective strip may be a continuous long strip or short intermittent strips. In this way, a periphery of the machine body 100 will not be scratched due to the cooperation with the water tank 200, which is beneficial to maintaining the appearance of the outer side wall of the machine body 100.

Figure 17:
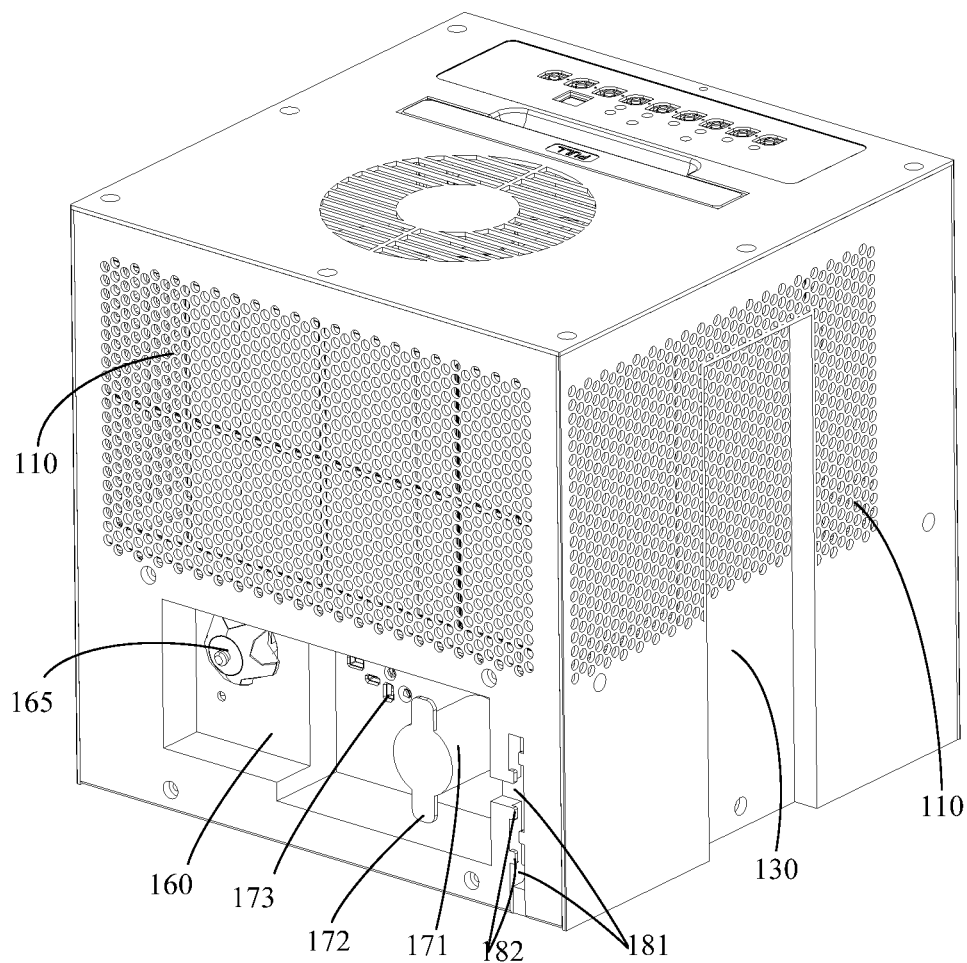
FIG. 17 is a schematic structural diagram of the machine body of the dehumidifier according to still another embodiment of this application.

Referring to FIG. 17, regarding the cord coiling structure.

The outer side of the machine body 100 includes a storage slot 160 recessed into an interior of the machine body 100 for receiving a power cord of the dehumidifier. Specifically, in this embodiment, the storage slot 160 may have one of many shapes, such as a cuboid shape, a cylindrical shape, etc., and its shape may be adapted to the overall shape of the machine body 100. When a side surface including the storage slot 160 is a flat surface, the storage slot 160 may have a cuboid shape, and when the side surface including the storage slot 160 is a cylindrical surface, the storage slot 160 may be cylindrical. With the storage slot 160, the power cord may be completely received in the storage slot 160.

In this embodiment, the outer side of the machine body 100 includes a storage slot 160 recessed into an interior of the machine body 100 for receiving the power cord of the dehumidifier. In the idle state, the power cord of the dehumidifier is received in the storage slot 160 so that the power cord does not protrude from a peripheral side of the machine body 100, so that the machine body 100 may be easily and quickly received into the water tank 200.

In some embodiments, in order to further ensure that the power cord may be stably stored in the storage slot 160, the dehumidifier further includes a strap. In the idle state, the power cord is tied by the strap and is stored in the storage slot 160. There may be many types of straps. Take flexible ribbons as examples, such as rubber bands, cable ties, and so on.

To further ensure that the power cord may be stably stored in the storage slot 160, structural components may be provided in the storage slot 160.

Specifically, the dehumidifier further includes a cord storage column 171 and a limit stopper 172. One end of the cord storage column 171 is fixedly connected to a side wall of the storage slot 160, and the other end of the cord storage column 171 is fixedly connected to the limit stopper 172. The limit stopper 172 does not protrude from a slot opening of the storage slot 160. In this way, the power cord may be coiled on the cord storage column 171, and the power cord coiled on the cord storage column 171 is stopped by the limit stopper 172, and will not detach and exceed the limit stopper 172, that is, the power cord coiled on the cord storage column 171 will not protrude from the outer surface of the machine body 100. In this way, the storage condition of the power cord in the idle state may be effectively guaranteed.

In some embodiments, in order to coil the power cord more conveniently, a slot wall connected to the cord storage column 171 is provided opposite to the slot opening. In this way, the operator may watch the coiling position, and the operable space is very large, which is convenient for the user's operation.

In some embodiments, in order to standardize the wiring of the power cord and prevent the power cord from protruding from the surface of the machine body 100, a cable trough 181 is formed on the surface of the machine body 100 adjacent to the storage slot 160 to limit a direction of the power cord. The power cord may be arranged in the cable trough 181, and a slot depth of the cable trough 181 is greater than a diameter of the power cord, so that the power cord may be received in the cable trough 181.

In order to make the power cord go out from the storage slot 160 more smoothly and reliably, the cable trough 181 may be communicated with the storage slot 160. In this way, the power cord may directly enter the cable trough 181 from the storage slot 160 without protruding from the outer surface of the machine body 100 in the middle.

In order to further improve the reliability of the power cord in the wiring, the outer side wall of the machine body 100 is provided with a retaining rib 182, and the retaining rib 182 and the cable trough 181 enclose to form a limit trough that limits a position of the power cord. The retaining rib 182 is disposed on a side wall of the cable trough 181, and an outer surface of the retaining rib 182 is flush with the outer side wall of the machine body 100. In this way, when the power cord is in the cable trough 181, it will not be separated from the cable trough 181 under the action of gravity or a slight external force, so that the wiring of the power cord is very reliable, which is beneficial to improving the stability of the dehumidifier.

In some embodiments, in order to protect a power plug from being damaged in the idle state, a slot wall of the storage slot 160 further includes a plug storage hole 173 for mounting the power plug. The storage hole 173 may have a variety of forms. It is possible to store plugs of different models and countries through the arrangement.

Figure 18:
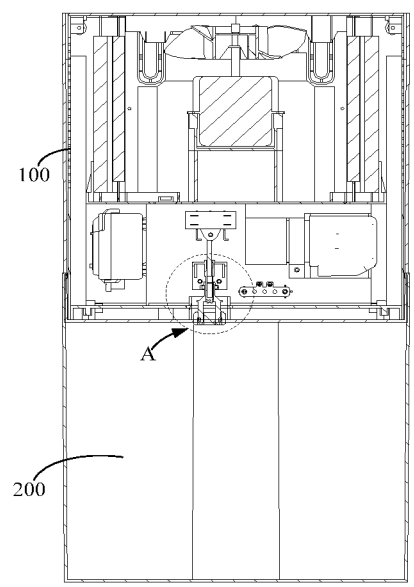
FIG. 18 is a schematic structural diagram of the dehumidifier in the working state according to a further embodiment of this application.
Figure 19:
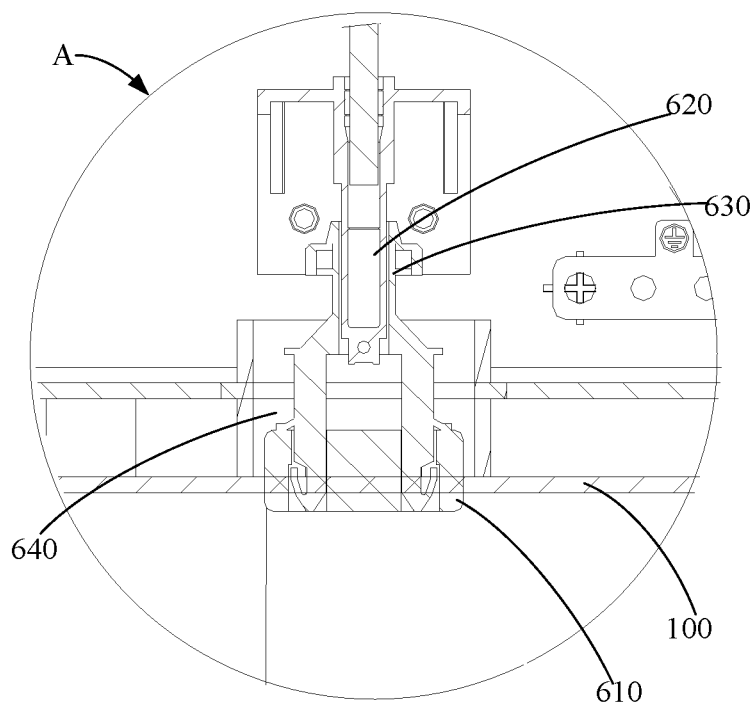
FIG. 19 is a schematic partial enlarged structural view at A in FIG. 18.
Figure 20:
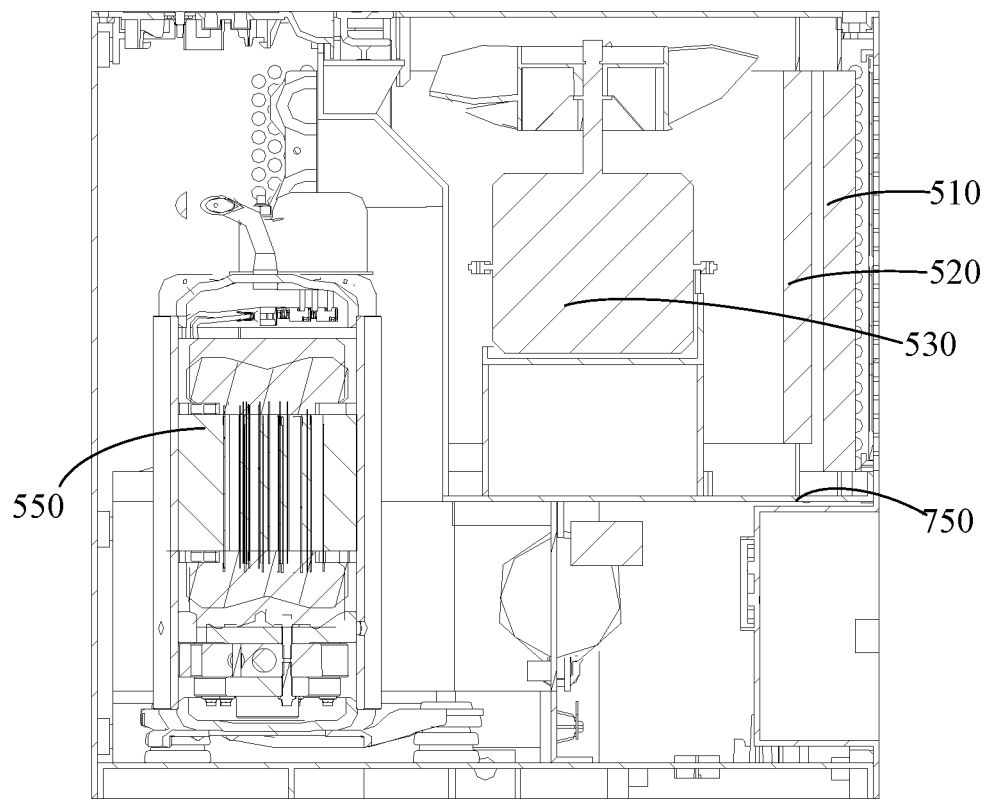
FIG. 20 is a schematic diagram showing an internal structure of the machine body of the dehumidifier (axial flow air duct) of this application from a right side of view.
Figure 21:
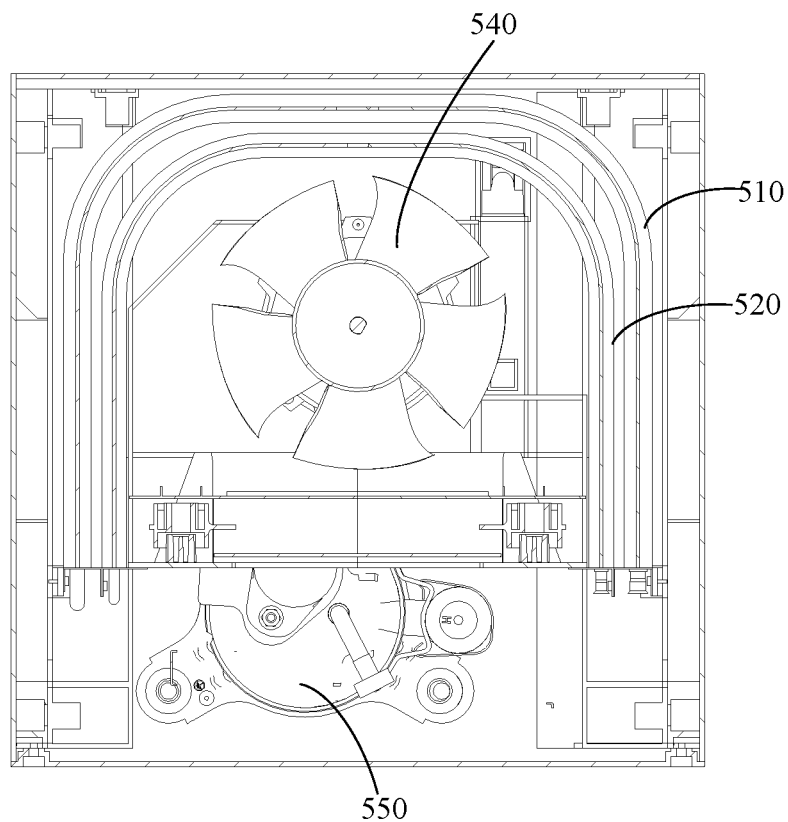
FIG. 21 is a schematic diagram showing an internal structure of the machine body of the dehumidifier (axial flow air duct) of this application from a top view.
Figure 22:
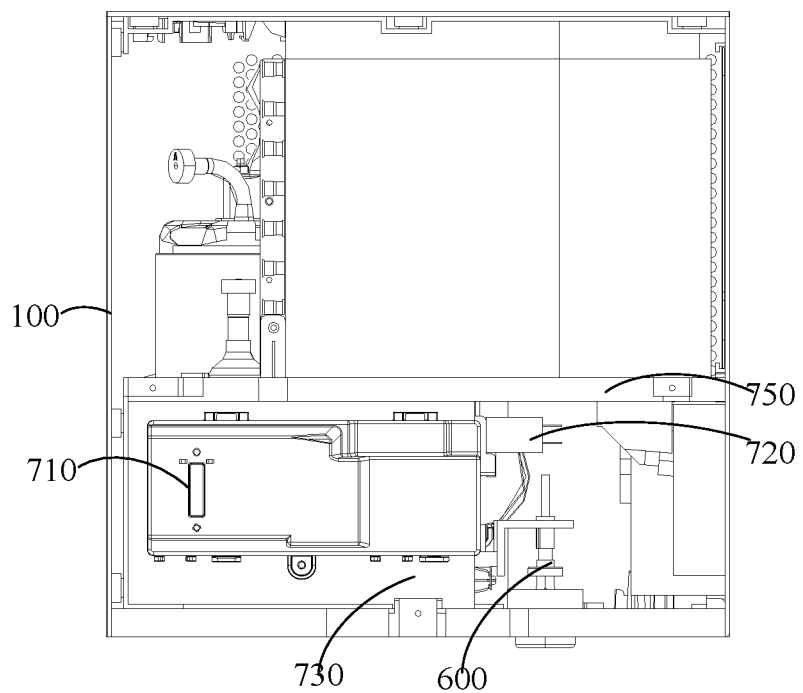
FIG. 22 is a schematic structural diagram of the machine body of the dehumidifier of this application with a right side plate removed.
Figure 23:
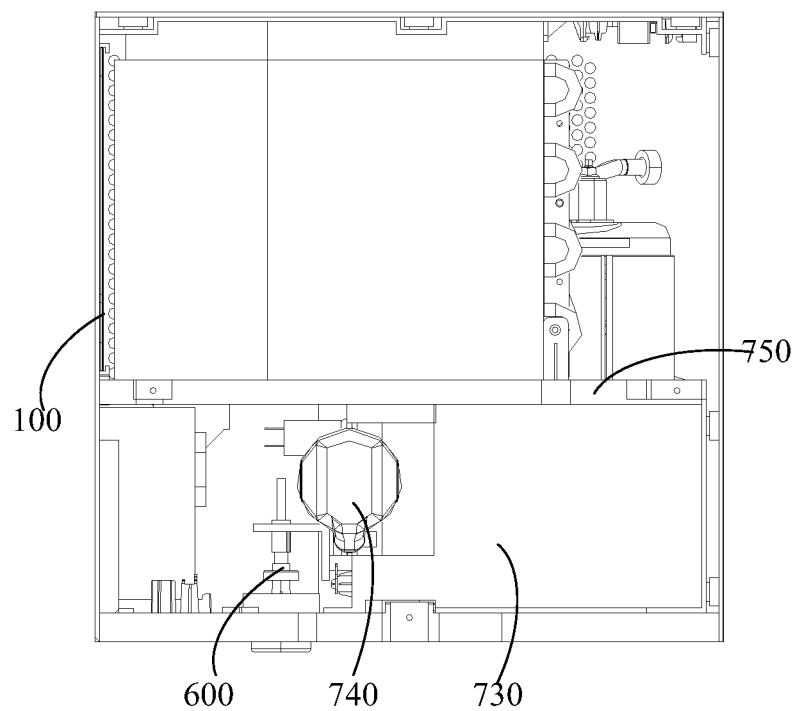
FIG. 23 is a schematic structural diagram of the machine body of the dehumidifier of this application with a left side plate removed.
Figure 24:
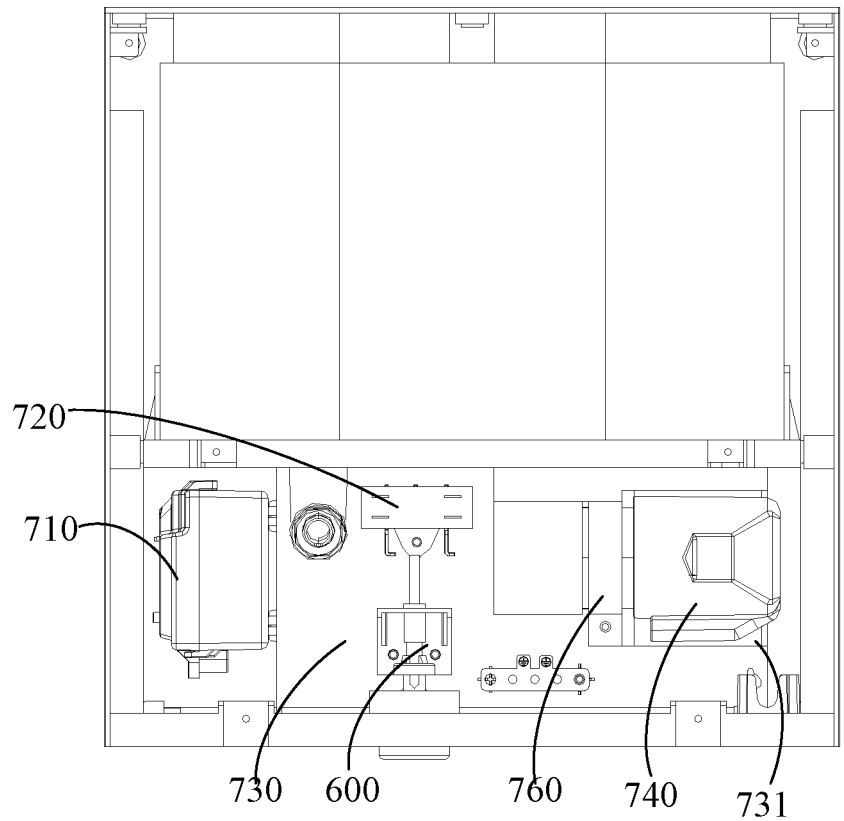
FIG. 24 is a schematic structural diagram of the machine body of the dehumidifier of this application with a rear side plate removed.
Figure 25:
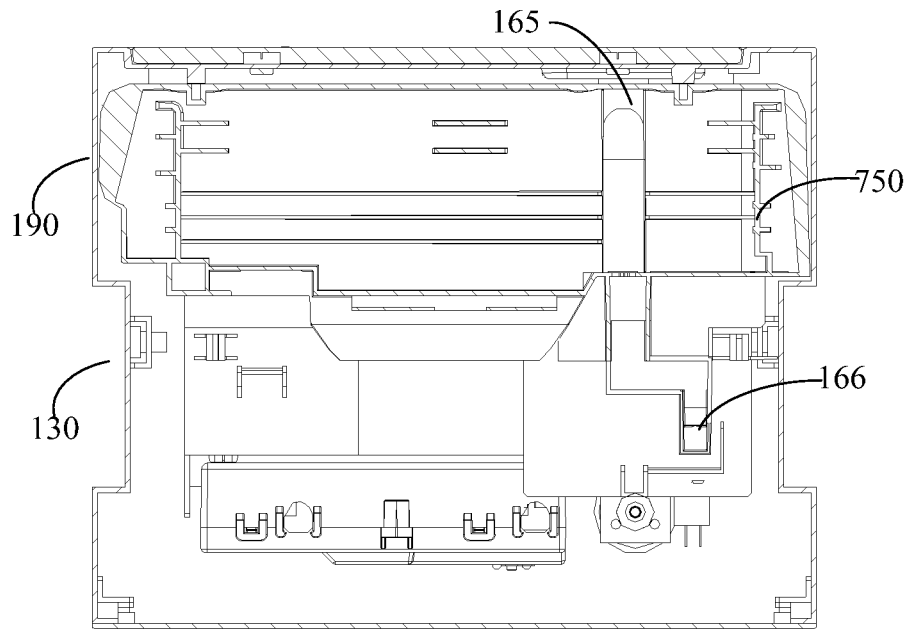
FIG. 25 is a schematic structural diagram of an internal waterway of the machine body of the dehumidifier of this application.

Referring to FIGS. 18 to 19, regarding water level detection.

There are many ways to detect the water level, which may be wireless detection (such as ultrasonic detection, capacitance detection), or physical detection (floating ball detection). Specific examples are given below for description.

Ultrasonic wireless detection: the dehumidifier includes an ultrasonic water level detection device configured to detect a water level in the water tank 200, and the ultrasonic water level detection device is electrically connected to an electric control main board of the dehumidifier, and a main control circuit is provided on the electric control main board. The ultrasonic water level detection device sends detected water level information in the water tank 200 to the electronic control main board, and the electronic control main board judges a current water level. When a preset water level is not reached, a detection result is ignored, and when the preset water level is reached, dehumidification is stopped to avoid the water continues to increase and overflow the water tank 200, causing immeasurable consequences.

Certainly, in some embodiments, the dehumidifier further includes an alarm device, and the alarm device is electrically connected to the electronic control main board and/or the ultrasonic water level detection device. When the water level is about to reach the preset water level, or has reached the preset water level, the electronic control main board controls the alarm device to give an alarm to remind the user that the current water level needs to be dealt with in time. Certainly, in some embodiments, the alarm device may be directly electrically connected to the ultrasonic water level detection device. In this way, the alarm device may directly send an alarm based on the detection result of the water level detection device.

In order to detect the water level in the water tank 200 conveniently and safely, the machine body 100 may be located directly above the water tank 200, and the ultrasonic water level detection device may be arranged at the bottom of the machine body 100. The dehumidifier further includes a display device 140, and the ultrasonic water level detection device is electrically connected to the display device 140. The setting of the display device 140 facilitates the user to intuitively monitor the working condition of the dehumidifier, and the current water level in the water tank 200 may also be observed from the display device 140. There are many positions where the display device 140 may be arranged, take the display device 140 arranged on the top of the machine body 100 as an example. Certainly, in some embodiments, the display device 140 may also be arranged on a front side of the machine body 100.

Physical detection by water level switch 600: the dehumidifier includes a water level switch 600, the water level switch 600 is arranged at the bottom of the machine body 100, and the water level switch 600 includes a float 610. The dehumidifier has an idle state, and in the idle state, at least part of the machine body 100 is received in the receiving cavity 210. The bottom of the machine body 100 includes a receiving slot 640 recessed into the machine body 100. The float 610 is movably connected to the machine body 100, and the float 610 may be completely received in the receiving slot 640 in the idle state.

Specifically, in this embodiment, the water level switch 600 is configured to detect the water level in the water tank 200, and the water level switch 600 includes a float 610. When the water level switch 600 detects the water level, the float 610 is in contact with the liquid surface, or is suspended. When the liquid level reaches a certain level and is in contact with the float 610, it supports the float 610. As the liquid level rises, a position of the float 610 changes, and the water level is determined according to a change in a height of the float 610. What changes with the position of the float 610 may be a capacitance or a magnetic induction intensity. According to the change of capacitance or the change of magnetic induction intensity, the working condition of the dehumidifier is controlled. When the capacitance or magnetic induction intensity reaches a preset value, the dehumidifier stops working. A receiving slot 640 that may completely receive the float 610 is formed at the bottom of the machine body 100. When the dehumidifier is in the idle state, the float 610 may be completely received in the receiving slot 640.

In this embodiment, by providing the water level switch 600 at the bottom of the machine body 100, and including a receiving slot 640 recessed into the machine body 100 at the bottom of the machine body 100, the float 610 may be completely received in the receiving slot 640 when in the idle state, so that the float 610 may not protrude from the machine body 100. In this way, the machine body 100 may be stably placed on the ground and the water tank 200, and it is also beneficial for the machine body 100 to be quickly placed in the water tank 200.

In some embodiments, in order to ensure that the float 610 may accurately enter the receiving slot 640, the water level switch 600 further includes a guide rod 620 connected to the float 610, and the machine body 100 includes a guide hole 630 communicating with the receiving slot 640. An end of the guide rod 620 away from the float 610 is movably mounted in the guide hole 630. By providing the guide rod 620 and the guide hole 630, the guide rod 620 may move along the guide hole 630. With the force of the float 610 on the guide rod 620, the guide rod 620 may move along the guide hole 630 toward the inside of the machine body 100. When the machine body 100 is placed on the ground, the float 610 is completely squeezed into the receiving slot 640.

In some embodiments, in order to ensure the flexibility of the movement of the float 610, the guide hole 630 is vertically formed directly above the receiving slot 640. In this way, the guide rod 620 and the float 610 may move straightly up and down along the guide hole 630, so that the movement directions of the float 610 and the guide rod 620 are consistent with a force direction of the float 610 (gravity and buoyancy of water on the float 610), which is beneficial for the float 610 to move up and down.

In some embodiments, in order to improve the accuracy and sensitivity of water level detection, the water level switch 600 may be a magnetic control switch, and the detection state of the water level switch 600 includes an open state and a closed state. In the detection state, the float 610 extends from the receiving slot 640 and protrudes from the bottom of the machine body 100. Specifically, the water level switch 600 includes a magnetic float switch. A magnetic member may be provided in the float to change the magnetic field as the float 610 moves. As the float 610 rises, an intensity of the magnetic field at the bottom of the machine body 100 increases. By setting the water level switch 600 as a magnetic control switch, the water level switch 600 may quickly and accurately detect the current water level. In some embodiments, the water level switch 600 may be electrically connected to the electric control main board of the dehumidifier. The dehumidifier further includes an alarm device, and the alarm device is electrically connected to the electric control main board and/or the water level switch 600.

Regarding air duct system.

Referring to FIGS. 20 to 25, regarding axial flow air duct system.

The dehumidifier includes: a machine body 100 including a case 190, the case 190 including an air inlet 110, an air outlet 120, and an air duct communicating the air inlet 110 and the air outlet 120;

an axial flow fan arranged in the air duct, an air outlet direction of the axial flow fan facing the air outlet 120; and a compressor 550 arranged inside the case 190 and arranged side by side with the axial flow fan.

Specifically, in this embodiment, the axial flow fan and the compressor 550 are arranged side by side, and the two may extend in many directions, such as both being arranged vertically or both being arranged horizontally. Take the two both being arranged vertically as an example, the two at least partially overlap in the vertical direction. For example, a top of the compressor 550 extends to a middle or an upper part of the drive motor 530. Compared with the conventional layout (the compressor 550 and the axial flow fan are separately arranged on two layers, and there is no overlap between the two), the arrangement of the compressor 550 and the axial flow fan greatly reduces a height of the entire machine body 100.

In this embodiment, by arranging the axial flow fan and the compressor 550 side by side, compared to the conventional arrangement of upper and lower layers, the space occupied by the axial flow fan and the compressor 550 in the height direction is greatly reduced, thereby improving the compactness of the internal components of the dehumidifier, so that the height of the machine body 100 may be greatly reduced, which is conducive to reducing the height and volume of the machine body 100, thereby facilitating the transportation and storage of the machine body 100. In addition, since the arrangement of the water tank 200 does not need to be considered for the arrangement of the machine body 100, the arrangement of the components inside the machine body 100 is more reasonable and compact.

In some embodiments, in order to further improve the compactness of the structures and the heat exchange efficiency of the heat exchanger, the dehumidifier includes an evaporator 510 and a condenser 520 that are stacked. The evaporator 510 and/or the condenser 520 are/is arranged in the air duct and each have a U shape, and the axial flow fan is located in an area surrounded by the evaporator 510 and the condenser 520.

Specifically, in this embodiment, the evaporator 510 and/or the condenser 520 each have a U shape, so that the axial flow fan may be arranged in the U-shaped area. In this way, the space is fully utilized and the compactness of the structures is improved, so that each part of the evaporator 510 and the condenser 520 may have considerable negative pressure (the axial flow fan delivers the air in the U-shaped area out of the air duct, and the negative pressure is formed in the U-shaped area), so that the air flows passing through the parts of the evaporator 510 and the condenser 520 are equivalent, which is beneficial to greatly improving the efficiencies of the evaporator 510 and the heat exchanger.

In addition, by configuring the evaporator 510 and the condenser 520 to be U-shaped, heat exchanger efficiencies of the evaporator 510 and the condenser 520 are greatly increased, which is beneficial to improving the dehumidification efficiency of the dehumidifier. In order to further improve the heat exchanger efficiencies of the evaporator 510 and the condenser 520, air inlets 110 are formed corresponding to multiple surfaces of the U-shaped evaporator 510 and condenser 520. Take the air inlets 110 being formed on the left, right, and rear sides as an example, the air inlets 110 correspond to the U-shaped area on both lateral arms and a middle part respectively. In this way, sufficient air flow is provided for the heat exchange between the evaporator 510 and the condenser 520.

In some embodiments, in order to improve the dehumidification effect, the evaporator 510 is disposed close to an inner side wall of the case 190, and the condenser 520 is disposed close to the axial flow fan. The air is first cooled and dehumidified through the evaporator 510, and then heated back to the temperature through the condenser 520, which is beneficial to improving the dehumidification effect.

The air inlet 110 is formed at the top of the machine body 100, and a bottom of the compressor 550 is fixedly connected to a bottom of the case 190 and is arranged vertically. The axial flow fan includes a drive motor 530 and an axial flow impeller 540. The drive motor 530 is vertically arranged corresponding to the air outlet 120, and the axial flow impeller 540 is arranged close to the air outlet 120. With this arrangement, when the drive motor 530 drives the axial flow impeller 540 to rotate, the axial flow impeller 540 may efficiently send the dry air in the air duct out of the dehumidifier, which is beneficial to air flow and improves dehumidification efficiency.

In some embodiments, in order to further improve the compactness of the structures, the dehumidifier includes a machine body 100, and the machine body 100 includes:
a case 190 including an air inlet 110 and an air outlet 120;
a condenser 520 and an evaporator 510 which are disposed inside the case 190;
an axial flow fan, vertically disposed inside the case 190 and paralleled to the condenser 520 and the evaporator 510; and
a water receiving tray 750, disposed directly below the condenser 520, the evaporator 510 and the axial flow fan and dividing an inside of the case 190 to form an axial flow air duct and a containing cavity.

Specifically, in this embodiment, the water receiving tray 750 is disposed directly below the condenser 520, the evaporator 510 and the axial flow fan, and the case 190 is divided to form the axial flow air duct and the containing cavity for mounting other components. The water receiving tray 750 is in the shape of a flat plate. It not only has parts corresponding to the condenser 520 and the evaporator 510, but also has parts corresponding to the axial flow fan, so that the airflow in the axial flow air duct may be directly flown out of the air outlet 120 without scurrying in the air duct. Take the evaporator 510, the condenser 520, and the axial flow fan being all arranged vertically as an example.

In this embodiment, the axial flow fan is taken as the driving force of the air flow, and the axial flow fan is arranged side by side with the evaporator 510 and the condenser 520 in the vertical direction, so that the centralized arrangement of the three is conducive to the full and reasonable use of space. Further, the water receiving tray 750 is arranged directly below the evaporator 510, the condenser 520 and the axial flow fan, so that the case 190 is divided to form an axial flow air duct for heat exchange and a mounting cavity for mounting other common components of the dehumidifier (such as an electric control box 710, a fan capacitor 720, etc.). In this way, it not only makes full and reasonable use of space, but also ensures the rationality of the air duct (to avoid excessive dispersion of airflow in the case 190, resulting in low flow rate and affecting dehumidification efficiency). In this way, the compactness of the internal components of the dehumidifier is improved, the utilization of space is improved, and the volume of the machine body 100 is reduced, thereby facilitating the transportation and storage of the machine body 100. In addition, since the arrangement of the water tank 200 does not need to be considered for the arrangement of the machine body 100, the arrangement of the components inside the machine body 100 is more reasonable and compact.

In some embodiments, in order to further improve the space utilization rate, the compressor 550 of the dehumidifier is vertically arranged at the bottom of the case 190, and the water receiving tray 750 includes an avoidance notch corresponding to the compressor 550. The compressor 550 is arranged side by side with the axial flow fan, and a top of the compressor 550 extends to a middle or even an upper part of the axial flow fan.

In order to further improve space utilization and ease of installation of components, the dehumidifier further includes a partition plate 730. The partition plate 730 is located in the mounting cavity, and one side of the partition plate 730 is connected to the bottom of the case 190, and the opposite side is fixedly connected to a bottom of the water receiving tray 750. The partition plate 730 supports the water receiving tray 750. When the evaporator 510, the condenser 520 and the axial flow fan fall on the water receiving tray 750 during transportation or collision, the partition plate 730 may support the water receiving tray 750 to avoid the evaporator 510, the condenser 520 and the axial flow fan from being damaged by a large collision. Further, the partition plate 730 also provides a location for the mounting of components, so that multiple components of the dehumidifier may be conveniently mounted on the partition plate 730.

Specifically, an electric control box 710 is provided on the partition plate 730, and/or a fan capacitor 720 is provided on the partition plate 730, and/or a water level switch 600 is provided in the mounting cavity. That is, the electrical control box 710 and the fan capacitor 720 may be provided on the partition plate 730, and the water level switch 600 may also be provided on the partition plate 730. In this way, while providing support for the components in the axial flow air duct, the partition plate 730 also provides space for the mounting of components. In order to use the space more reasonably, the fan capacitor 720, the electric control box 710, etc., may be mounted on different partition plates 730.

In order to further utilize the space, the partition plate 730 includes at least two sub-partition plates, which are arranged in the containing cavity at an angle. The dehumidifier includes a compressor capacitor 740 and an electric control box 710, and the compressor capacitor 740 and the electric control box 710 are mounted on different sub-partition plates. For example, the electric control box 710 is mounted on the sub-partition plate on the right side, and the compressor capacitor 740 is mounted on the sub-partition plate on the rear side. In this way, the larger components are arranged separately, so that the components are mounted without affecting each other, which is beneficial to improving the compactness and stability of the structures.

In some embodiments, in order to improve the reliability of the mounting of the compressor capacitor 740 and increase the utilization of space, the dehumidifier further includes an arc-shaped fastening piece. The sub-partition plate where the compressor capacitor 740 is mounted includes a mounting gap 731, the compressor capacitor 740 is clamped in the mounting gap 731 and is fixed on the sub-partition plate through the arc-shaped fastening piece.

In order to further improve the compactness of the structures, the evaporator 510 and the condenser 520 are arranged in the case 190 and each have a U shape, and the axial flow fan is located in an area surrounded by the evaporator 510 and the condenser 520. The air outlet 120 is formed at the top of the case 190, and a bottom of the compressor 550 is fixedly connected to a bottom of the case 190 and is arranged vertically. The axial flow fan includes a drive motor 530 and an axial flow impeller 540. The drive motor 530 is vertically arranged corresponding to the air outlet 120, and the axial flow impeller 540 is arranged close to the air outlet 120.

In some embodiments, in order to ensure the drainage of the dehumidifier, a drainage hole 165 is formed on the rear side of the case 190, one end of the drainage hole 165 is in communication with the water receiving tray 750, and the other end of the drainage hole 165 is in communication with the outside; and/or, the machine body 100 includes a drainage passage 166 arranged along the height direction of the machine body 100, one end of the drainage passage 166 is in communication with the water receiving tray 750, and the other end of the drainage passage 166 is in communication with the direct bottom of the machine body 100. That is, the dehumidifier has two sets of drainage systems. When the dehumidifier can be connected to an external drainage pipe, the condensed water may be directly discharged through the external drainage pipe. When the working environment cannot provide an external drainage pipe, the condensed water may be stored in the water tank 200 under the machine body 100 through the drainage passage 166. In this way, the dehumidifier may be adapted to different working environments, which is beneficial to improving the adaptability of the dehumidifier.

Figure 26:
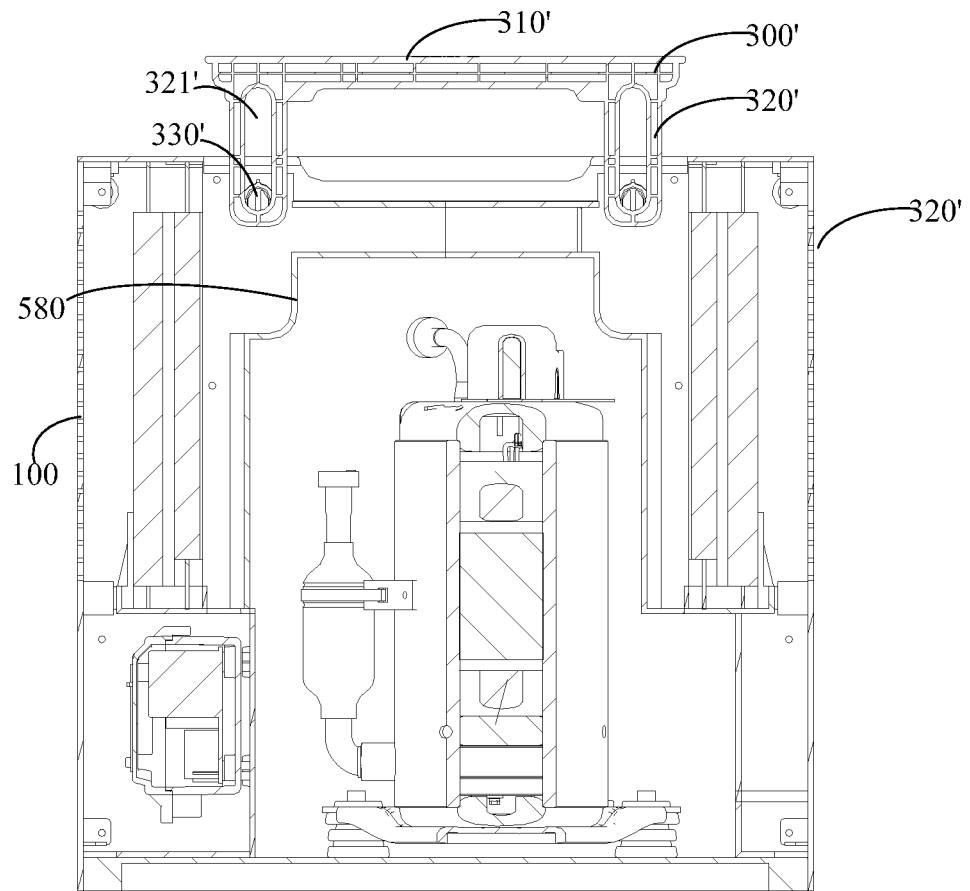
FIG. 26 is a schematic structural diagram of a lifting handle of the dehumidifier according to an embodiment of this application.
Figure 27:
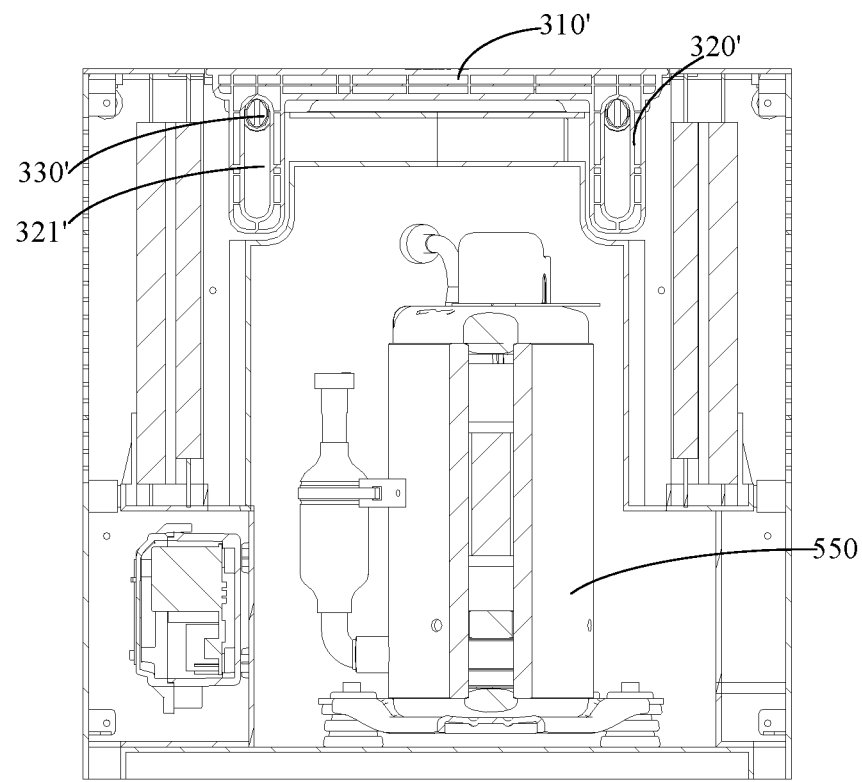
FIG. 27 is a schematic structural diagram of the lifting handle in FIG. 26 in another position.

Referring to FIGS. 26 to 27, regarding lifting handle 300'.

The dehumidifier includes a lifting handle 300'. The top of the machine body 100 includes a drawing port, and the lifting handle 300' is movably mounted in the drawing port, so that the lifting handle 300' does not protrude from the peripheral side of the machine body 100 in the working state or the idle state.

In this embodiment, the dehumidifier is divided into two parts: a machine body 100 and a water tank 200, and the machine body 100 has an independent dehumidification function, which may collect water vapor in the air, and in an idle state, the machine body 100 is at least partially received in the receiving cavity 210, which greatly reduces the volume of the dehumidifier when it is idle, and increases the loading quantity during storage and transportation, which greatly saves the cost of transportation and storage. Further, by including the drawing port on the top of the machine body 100, and movably mounting the lifting handle 300' in the drawing port, the lifting handle 300' does not protrude from the peripheral side of the machine body 100 in the working state or the idle state, so that the machine body 100 may be conveniently and quickly loaded into the water tank 200.

In some embodiments, in order to further improve the compactness of the structures, the machine body 100 includes a receiving space, and the lifting handle 300' may be received in the receiving space when the lifting handle 300' is idle. By arranging the receiving space, the lifting handle 300' may be received in the space without protruding from the top of the machine body 100. As a result, the lifting handle 300' does not block the view of the top of the machine body 100, does not affect the viewing of the display device 140, and does not affect the air outlet from the air outlet 120.

The lifting handle 300' includes a horizontal grip rod 310' and a vertical guide rod 320'. One end of the guide rod 320' is connected to the grip rod 310', and the guide rod 320' includes a guide slot 321' with two ends closed. A fixation column 330' is provided on the machine body 100 corresponding to the drawing port, and the guide slot 321' is sleeved on the fixation column 330'.

The fixation column 330' is fixedly connected to the machine body 100. When the lifting handle 300' is lifted up, a lower end of the guide slot 321' abuts against the fixation column 330', and the weight of the machine body 100 is transmitted to the lifting handle 300' through the fixation column 330'. When the lifting handle 300' is placed downward, an upper end of the guide slot 321' abuts against the fixation column 330' to support the lifting handle 300'. In some embodiments, in order to improve the reliability of lifting the machine body 100 by the lifting handle 300', a number of the guide rod 320' is two, and the two guide rods 320' are respectively arranged on two ends of the grip rod 310'. In this way, the machine body 100 may receive forces on opposite sides, so that the machine body 100 receives more uniform forces.

In order to improve the space utilization of the dehumidifier, when the lifting handle 300' is idle, a top of the grip rod 310' is flush with the top of the machine body 100, and a hand grip position 150 is provided on one side of the drawing port. By providing the hand grip position 150, the operator may easily hold the lifting handle 300'.

In order to improve the utilization of the space at the top of the machine body 100 and ensure the area of the air outlet 120, the top of the machine body 100 includes an air outlet 120, and the air outlet 120 and the hand grip position 150 are respectively located on two opposite sides of the drawing port. In this way, the hand grip position 150 does not occupy the area of the air outlet 120, so that the area of the air outlet 120 may be larger.

In order to further improve the space utilization of the dehumidifier, a fan is provided inside the machine body 100, and an enclosure 580 is provided corresponding to the fan. The enclosure 580 includes an avoidance notch that avoids the guide rod 320'. By arranging the avoidance gap, the structure of the air duct is ensured, and the lifting handle 300' may be received.

Figure 28:
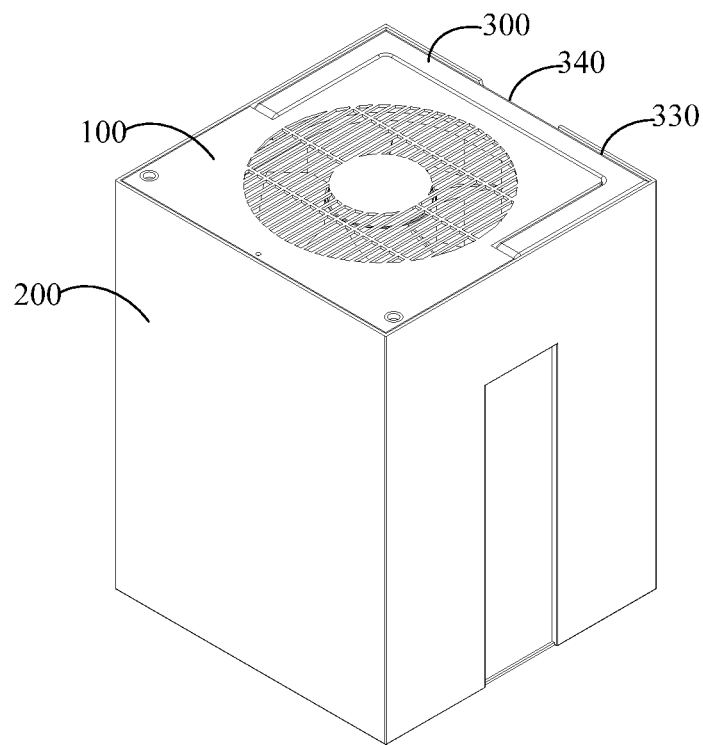
FIG. 28 is a schematic structural diagram showing a position of a handle when the dehumidifier is in the idle state according to an embodiment of this application.
Figure 29:
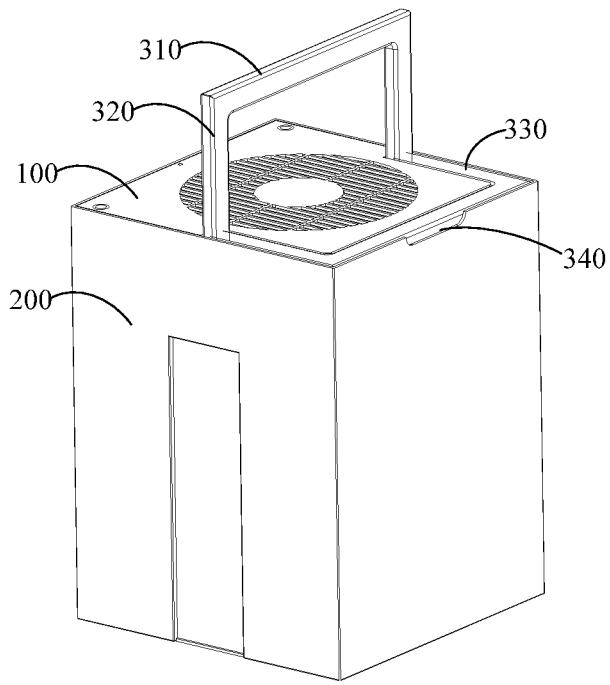
FIG. 29 is a schematic structural diagram of the handle in FIG. 28 in another position.
Figure 30:
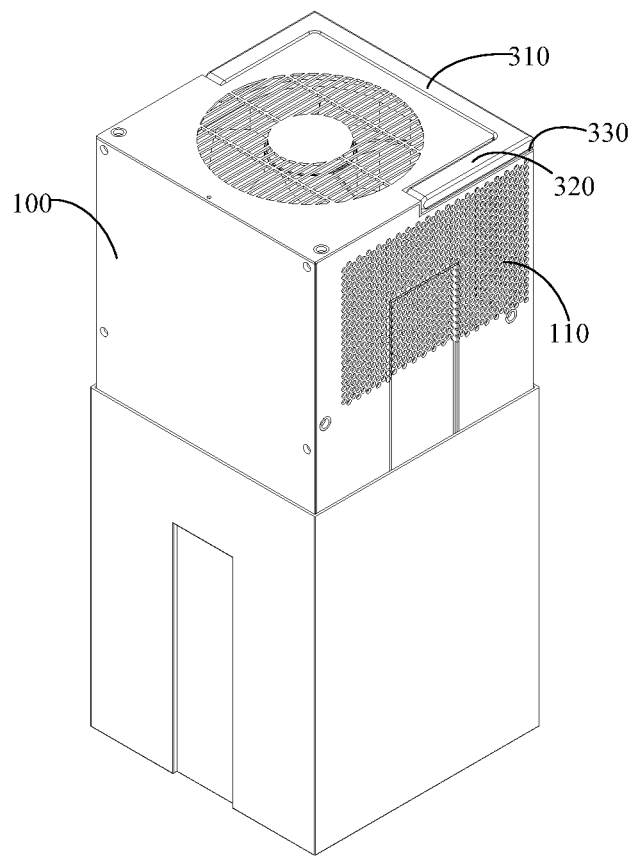
FIG. 30 is a schematic structural diagram of the position of the handle when the dehumidifier is in the working state according to an embodiment of this application.

Referring to FIGS. 28 to 30, in some embodiments, the dehumidifier includes a handle 300. The top of the machine body 100 is provided with a mounting recess 330. The handle 300 is rotationally connected to a side wall of the mounting recess 330, so that the handle 300 does not protrude from the peripheral side of the machine body 100 when in the working state or when in the idle state.

In this embodiment, in addition to reducing the volume of the dehumidifier in the idle state, by including the mounting recess 330 on the top of the machine body 100 and rotationally connect the handle 300 to the side wall of the mounting recess 330, the handle 300 does not protrude from the peripheral side of the machine body 100 in the working state or the idle state, so that the machine body 100 may be conveniently and quickly loaded into the water tank 200.

In some embodiments, in order to further improve the compactness of the structures, when the handle 300 is idle, the handle 300 may be received in the mounting recess 330. A depth of the mounting recess 330 is greater than or equal to a height of the handle 300 when placed horizontally. The mounting recess 330 is located at an edge of the top of the machine body 100. When the handle 300 is received in the mounting recess 330, an outer side wall of the handle 300 is flush with the outer side wall of the machine body 100; and/or, a top of the handle 300 is flush with the top of the machine body 100. In this way, the handle 300 is kept away from a middle of the top of the machine body 100, and the layout of the top of the machine body 100 is not affected.

In addition, because the handle 300 is not arranged in the middle of the top of the machine body 100, but on the edge of the top of the machine body 100, the area of the air outlet 120 on the top may be set according to requirements, thereby effectively ensuring the air outlet area and efficiency, which is beneficial to ensuring the working efficiency of the dehumidifier.

In some embodiments, in order to facilitate gripping of the handle 300, the top of the water tank 200 includes a hand grip notch 340 corresponding to the handle 300. The arrangement of the hand grip notch 340 allows the operator to directly hold the handle 300 through the hand grip notch 340, which facilitates the operation of the handle 300.

In some embodiments, in order to improve the reliability of lifting the machine body 100 by the handle 300, the handle 300 includes a lateral hand rod 310 and two connection rods 320. One end of each connection rod 320 is connected to the hand rod 310, and the other end of each connection rod 320 is respectively pivotally connected to the mounting recess 330 on opposite sides of the machine body 100. The handle 300 is U-shaped, and the hand rod 310 is located between the two connection rods 320. The hand rod 310 and the two connection rods 320 of the handle 300 are located on the edge of the top of the machine body 100, respectively.

In order to improve the stability of lifting the machine body 100 by the handle 300, the connection positions between the connection rods 320 and the mounting recess 330 are located in the middle of the sides of the machine body 100. In this way, the two connection rods 320 are respectively located in the middle of the corresponding side walls, so that the center of gravity of the machine body 100 may act on the vertical connection rods 320, and the two connection rods 320 are ensured to be balanced on both sides, so that the stability of lifting the machine body 100 by the handle 300 is greatly improved.

The above are only the preferred embodiments of this application, and therefore do not limit the scope of this application. Under the concept of this application, any equivalent structural transformation made by using the content of the description and drawings of this application, or direct/indirect application in other related technical fields are all included in the scope of this application.

What is claimed is:

1. A dehumidifier comprising:
    a machine body including a case, the case including an air inlet, an air outlet, and an air duct communicating the air inlet and the air outlet;
    an axial flow fan arranged in the air duct, an air outlet direction in which an air flow leaves the axial flow fan being configured to face the air outlet and being parallel to a rotation axis of the axial flow fan;
    a compressor arranged inside the case and side by side with the axial flow fan; and
    an evaporator and a condenser that are stacked and arranged in the air duct, each of the evaporator and the condenser having an overall shape of a U shape and including:
        a first part facing a first side of the axial flow fan;
        a second part facing a second side of the axial flow fan that is opposite to the first side; and
        a third part connecting the first part and the second part, and facing a third side of the axial flow fan that connects the first side and the second side.

2. The dehumidifier of claim 1, wherein the air inlet is one of a plurality of air inlets provided corresponding to a plurality of surfaces of the evaporator and the condenser.

3. The dehumidifier of claim 1, wherein the evaporator is disposed closer than the condenser to an inner side wall of the case, and the condenser is disposed closer than the evaporator to the axial flow fan.

4. The dehumidifier of claim 1, wherein the air outlet is located at a top of the case.

5. The dehumidifier of claim 4, wherein:
    a bottom of the compressor is fixedly connected to a bottom of the case and arranged vertically; and
    the axial flow fan includes:
        a drive motor vertically arranged corresponding to the air outlet; and
        an axial flow impeller arranged closer than the drive motor to the air outlet.

6. The dehumidifier of claim 5, wherein a top of the compressor is configured to extend to a middle part or an upper part of the drive motor.

7. The dehumidifier of claim 1, further comprising:
    a water tank including a receiving cavity;
    wherein:

the machine body has a dehumidification function;
the dehumidifier has a working state and an idle state; and
the receiving cavity of the water tank is configured to:
store water formed by dehumidification of the machine body in the working state; and
receive at least part of the machine body in the idle state.

8. The dehumidifier of claim 7, wherein:
the receiving cavity includes a support boss on an inner side wall of the receiving cavity;
the machine body includes an avoidance slot on an outer side wall of the machine body and corresponding to the support boss;
the support boss is configured to be received in the avoidance slot in the idle state to at least partially receive the machine body in the receiving cavity; and
the avoidance slot is configured to be staggered with the support boss in the working state.

9. The dehumidifier of claim 8, wherein the support boss is vertically provided along a height direction of the water tank, and the avoidance slot is vertically provided along a height direction of the outer side wall of the machine body.

10. The dehumidifier of claim 8, wherein:
the water tank includes a slot on an outer side wall of the water tank and corresponding to the support boss; and
a side wall of the water tank is configured to protrude inwards towards inside of the water tank to form the slot outside the water tank and the support boss.

11. A dehumidifier comprising:
a machine body including a case, the case including an air inlet, an air outlet, and an air duct communicating the air inlet and the air outlet;
an axial flow fan arranged in the air duct, an air outlet direction of the axial flow fan being configured to face the air outlet;
a compressor arranged inside the case and side by side with the axial flow fan; and
a water tank including a receiving cavity, the receiving cavity including a support boss on an inner side wall of the receiving cavity;
wherein:
the machine body includes an avoidance slot on an outer side wall of the machine body and corresponding to the support boss;
the support boss is configured to be received in the avoidance slot when the dehumidifier is in an idle state, to at least partially receive the machine body in the receiving cavity; and
the avoidance slot is configured to be staggered with the support boss when the dehumidifier is in a working state.

\* \* \* \* \*